(12) United States Patent
Bruso et al.

(10) Patent No.: US 7,356,549 B1
(45) Date of Patent: Apr. 8, 2008

(54) SYSTEM AND METHOD FOR CROSS-REFERENCE LINKING OF LOCAL PARTITIONED B-TREES

(75) Inventors: Kelsey L. Bruso, Minneapolis, MN (US); James M. Plasek, Shoreview, MN (US); John C. Rust, Brooklyn Park, MN (US)

(73) Assignee: Unisys Corporation, Blue Bell, PA (US)

( * ) Notice: Subject to any disclaimer, the term of this patent is extended or adjusted under 35 U.S.C. 154(b) by 359 days.

(21) Appl. No.: 11/102,990

(22) Filed: Apr. 11, 2005

(51) Int. Cl.
*G06F 17/30* (2006.01)
(52) U.S. Cl. .................................... 707/200
(58) Field of Classification Search ................. 707/200
See application file for complete search history.

(56) References Cited

U.S. PATENT DOCUMENTS 6,920,460 B1 * 7/2005 Srinivasan et al. ......... 707/102

2004/0199512 A1 * 10/2004 Cornwell et al. ............. 707/9

* cited by examiner

*Primary Examiner*—Chong H Kim
(74) *Attorney, Agent, or Firm*—Charles A. Johnson; Robert Marley

(57) ABSTRACT

A system and method for managing multiple partitions of a database are disclosed. According to one embodiment, each partition contains a subset of all records of the database, and is respectively associated with a secondary index B-tree, and a primary key B-tree. To retrieve a data record from the database, a partition is selected and a search is initiated on the associated secondary index B-tree for one or more records having a desired secondary index value. If records are so located, a primary key value obtained from one of the records is used to search the associated primary key B-tree to locate the data. In some cases, the search of the secondary index B-tree may not find the desired secondary index value within the selected partition. In these instances, pointers directed to one or more other partitions are used to locate records containing the desired secondary index value.

22 Claims, 17 Drawing Sheets

SYSTEM AND METHOD FOR CROSS-REFERENCE LINKING OF LOCAL PARTITIONED B-TREES

FIELD OF THE INVENTION

This invention relates to a system and method for constructing a database table; and, more specifically, relates to a mechanism for managing records in a database having multiple partitions.

BACKGROUND OF THE INVENTION

Computers are used today to store large amounts of data. Such information is often stored in information storage and retrieval systems referred to as databases. This information is stored and retrieved from a database using an interface known as a database management system (DBMS).

One type of DBMS is called a Relational Database Management System (RDBMS). An RDBMS employs relational techniques to store and retrieve data. Relational databases are organized into tables, wherein tables include both rows and columns, as is known in the art. Each row of a table may be referred to as a record. Each column defines a respective data item that may be saved within each of the records. For example, a column may store data that identifies a business name that is associated with the record. The remaining columns may store additional data for the business identified within the business name column.

One type of data structure used to implement the tables of a database is a B-tree, and its variant, a $B^+$-tree. As is known in the art, these tree structures are used to implement primary keys, secondary indexes, clustering indexes, non-clustering indexes, unique constraints, and the like.

A B-tree can be viewed as a hierarchical index. The root node is at the highest level of the tree, and stores one or more pointers, each pointing to a child of the root node. Each of these children may, in turn, store one or more pointers to children, and so on. At the lowest level of the tree are the leaf nodes, which have no children. The leaf nodes may contain data records or pointers or other indicia pointing to data records.

In addition to the pointers to child nodes, each of the non-leaf nodes of the B-tree also stores at least one index, or key, value that is used to search the tree for a particular data record. For instance, assume a node stores a first index value, and first and second pointers that each point to a child node. According to one exemplary organizational structure, the first pointer may be used to locate the child node storing one or more index values that are less than the first index value, whereas the second pointer is used to locate the child storing one or more index values greater than, or equal to, the first index. Using the index values and the pointers to search the tree in this manner, a node may be located that stores a record associated with a particular index value that is used as the search index.

As an example of the foregoing, consider a database that tracks residential phone numbers. A single B-tree may be created to allow for searching of the database. Each non-leaf node in the B-tree may store a first index value consisting of a last name. For each non-leaf node, a first pointer may be used to locate information on people having names less than the index value (e.g., preceding the index value name in an alphabetical listing). A second pointer is used to locate information on the remaining people. A variant of this B-tree may utilize two-part index values that include both first and last names so that a group of people having the same last name may be secondarily sorted alphabetically according to their first names.

As may be appreciated, a database that includes information for all people located within a given country, state, county, or other sizeable geographic area may become unwieldy. As a result, the time required to search the database may become prohibitive. In such cases, it may be beneficial to create multiple "partitions" for the database. Each of the partitions tracks information for a group of records, wherein the group may be defined based on the values in any one or more of the columns. As one example, unrelated records may be grouped into a given partition using a hash function.

Returning to the current example, a partition may be created for each city represented within the database. The partition includes a respective B-tree that tracks all of the people that live in that city. Then, when a search is conducted, a user not only specifies the index value (i.e., a person's name), but also the partition that is to be searched (the city in which the person lives.) Because the search is initiated on a much smaller sub-set of all of the database entries, it can be completed much more quickly.

Another advantage of maintaining separate B-trees for each partition involves increased availability. It is possible for the nodes of a B-tee to become corrupted, or to be unavailable because of ongoing updates to those nodes. If a database is managed using multiple B-trees that are each associated with a different partition, searches may be continue within most partitions even if some nodes of another partition are unavailable or corrupted. This increases the overall efficiency of the database.

On the other hand, when multiple partitions are maintained, efficiency may be decreased if a query does not, or cannot, provide the name of the partition to be searched. In this case, it is necessary to initiate separate searches for multiple ones, or even for all, of the partitions in the database. This is generally more time-consuming than if a single search could be initiated on a single B-tree that represents all of the names in the directory.

Another related problem involves the situation wherein a partition that is identified by a query is searched for an index value that is not located within the partition. Therefore, a search must be initiated on other associated partitions. For instance, if a search is initiated to locate a telephone number for a "John Doe" within the partition for "City A", and if the search does not locate this index value, it may be desirable to search the directories for an area "surrounding" City A. Again, if separate searches must be initiated from the root nodes of the B-trees for each of the cities in this "surrounding area", the search may be prohibitively time-consuming.

What is needed, therefore, is a system and method for maintaining a database that includes multiple partitions so that searching and management of these partitions can be performed in a more efficient manner.

SUMMARY OF THE INVENTION

The current invention provides an improved system and method for managing a database. According to one embodiment, the database is divided into multiple partitions. Each of the partitions includes a respective subset of all records within the database. These subsets are defined based on the values in any one or more of the columns of the records. As one example, unrelated records may be grouped into a given partition using a hash function.

Each of the partitions is associated with at least one B-tree. In one embodiment, each partition is associated with a secondary index B-tree that organizes records according to some secondary index value. The leaf nodes of the tree may, or may not, store the data records themselves. In either case, these records store information that allows the data records to be located. For instance, the leaf nodes may store information pointing to the data. Alternatively, these records may instead store a primary index, or "key", value that is used to search a primary key B-tree for a record storing the data.

The partitions of the database are generally arranged in some type of order. Assume, for example, that partitions are created based on a column that contains a city name. That is, all records for City A are grouped into one partition, all records for City B are grouped into another partition, and so on. The partitions may then be ordered within the database based on this name. For instance, the partition for City A may appear at the left edge of the database, the partition for City B may appear next followed by the partition for City C, and so on. In another embodiment, the ordering of the partitions may be based on a data column that is other than that used to create the partitions. For example, the partitions may be arranged based on a column storing geographical coordinates.

According to the invention, the records within the B-tree of a given partition store information that allows related records within other partitions to be readily located. In one embodiment, the records store pointers to one or more associated records in one or more other partitions. For instance, a record having a secondary index value "John Doe" may be linked to other records within different partitions that store this same value. This linking of records may be accomplished by storing pointer information or some other indicia that allows the records within the other partitions to be readily located.

Using the inter-partition linking information of the current invention, searching can be accomplished much more efficiently. As an example, assume a query is received to search the database for all records related to "John Doe" within a particular geographic area. All partitions associated with this area are therefore identified, and become the target of the search. Starting with a predetermined one of the partitions, a search is conducted on a corresponding B-tree. Assume one or more records having the desired secondary index value are located within this partition. Information stored within these records may be used to further locate records within one or more other partitions that also store this same index value. Information within these additional partitions may then be used to locate still more records having this index value, and so on. In this manner, all of the various partitions included in the geographic region may be expeditiously searched without having to initiate searches from the root node of each B-tree. The data associated with all located records, or optionally just a sub-set of the located records, may then be returned to the user.

It may be noted that when a search is conducted of a first-selected partition for a desired (target) index value, that index value may not be located. In this case, the search may continue at the root node of an adjacent partition. However, an alternative mechanism locates a record that has an index value preceding the insertion point for the target index value and that is linked to a record within another partition. The linking information within this preceding record is then used to traverse to that other partition. The search may continue at that location within the other partition for the target index value without having to initiate the search at the root node of that partition.

The foregoing mechanism of traversing between partitions is most readily adapted for use in an embodiment wherein pointer information always points to a partition immediately adjacent the partition that is currently being searched. In that embodiment, records within a particular partition may be linked to records in a leftward adjacent partition, and may further be linked to records within a rightward adjacent partition. That is, assuming the partitions are ordered in the manner discussed above, records for "John Doe" within the City B partition may be linked to records for "John Doe" within the partitions for City A and City C, since these are the partitions that are adjacent to the City B partition. In this embodiment, records within the City B partition are not linked to those in a City D partition, however. If records do not exist within one or more of the adjacent partitions, "null" information is stored in place of any linking information.

The stored linking information may be uni-directional or bi-directional. That is, a record within the City B partition may be linked to records in adjacent leftward and rightward partitions and vice versa so that searching can occur in either direction within the database. Alternatively, links may be maintained in only one direction.

The linking information may comprise any information which allows a record within another partition to be readily located. That is, this information may be an address pointer to a location in memory or some other storage facility. Alternatively, this information may identify the partition, a node within the B-tree of that partition, and a location within the node storing a record, thus allowing the search to readily locate the record without performing a complete search of the B-tree. Any other type of location information may be used in the alternative for this purpose.

In a different embodiment, the partitions may be linked to the nearest adjacent or non-adjacent partitions in the leftward or rightward direction, if such partitions exist. Thus, in this alternative embodiment, if the adjacent rightward City C partition does not contain a record with the target index value "John Doe", a record within the City B partition may instead be linked to a record in the City D partition. The linking information for the rightward partition is set to "null" only if the right edge of the database is encountered without first locating the desired index value. The same is true for the leftward linking information.

In any of the foregoing embodiments, the partitions may be ordered based on any one or more columns and according to any ordering mechanism. For instance, the above example orders partitions alphabetically based on a column storing a city name. They may instead be ordered based on geographic coordinates so that those partitions pertaining to adjoining areas are always searched together. Many other variations may be contemplated by those skilled in the art. If desired, the partitions may be ordered circularly so that there is no right or left edge, and the search concludes upon reaching the first-searched partition in the database. In this case, each record need only store pointers in one direction, if desired.

In a general implementation of the invention, any partition within the database may be updated at any time, so long as that partition is not locked by another query or some other process that is performing an update to the partition. In a more specific embodiment of the invention, the database is maintained as an archive database. In this variation, only a "current" partition may be updated with new records at any given time. After some predetermined event has occurred or some predetermined time period has elapsed, this "current" partition is made read-only and no further updates may be made to the partition. Also at this time, a new "current" partition is created at a predetermined location within the database, which is typically a left or right edge. This partition is initially empty. For a next predetermined time period, or until another predetermined event occurs, all updates are made to the new "current" partition, and so on.

In an archive database, records that are added to the current partition are only linked to records in a previous partition. Thus, pointers are always oriented in the same direction. That is, pointers are uni-directional such that records are not doubly linked.

Generally, archive databases utilize a time-related mechanism to determine when the next partition will be created. For instance, at the end of a predetermined time period such as a day, week, or month, the "current" partition becomes the most recent previous partition, and is made read-only. A new "current" partition is created to receive any additional records. In this type of scenario, the index values used to identify records may be time- and/or date-related. Because such index values are increasing, new partitions are conceptually added to a right edge of the database, and all leftward partitions are read-only. The records added to these leftward partitions reflect events that occurred in the past, and therefore may not be updated. Only the records being added to the current partition during the current time period may be updated. Pointer information within the records of an archive database may be limited to pointing to records stored within an adjacent partition, or may instead point to a nearest partition that stores a record having a same index value.

In one variation of an archive database, the partitions store both data records and place-holder records. A data record is a record that is associated with data. These are the types of records referred to in the above discussions. In contrast, a place-holder record is a record that is not yet associated with data stored within the database, but which has merely been created as a "place-holder" for data that may be inserted to the database in the future.

According to the variation described above, when a new current partition is created in an archive database, the new partition is initially populated with place-holder records. That is, a place-holder record is created for each index value that appears within the adjacent partition. For instance, in the foregoing example, a new partition would include one place-holder record for each secondary index value (e.g., each name) that appears in the adjacent partition. The place-holder record stores the respective secondary index value, and further stores pointer information that links the record to a closest data record having the same index value that is included within a different partition. Thus, if the adjacent partition merely stores another place-holder (rather than a data) record for index value "John Doe", a newly created place-holder record will skip over this adjacent partition and instead be linked to the nearest partition that includes a data record having this index value.

When an archive database is utilized, a search for a record having a target index value is always initiated on the current partition. If the search does not locate at least a place-holder record for the target index value, it is known this index value does not exist in the current or any other partition within the database. Moreover, when traversing partitions of the database to locate records for a target index value, once records are encountered that do not include information linking them to another partition, it is known that all records within the database storing the target index values have been located.

According to one embodiment of the current invention, a method of managing a database that includes multiple partitions is disclosed. This method includes creating a first record that stores an index value within a selected one of the partitions. The method further includes attempting to locate at least one record within a different one of the partitions that stores the index value, and if one or more such records are located, storing information within the first record that indicates the location of at least one of the located records.

Another method involves managing records of a database. This method includes creating multiple partitions, each storing associated ones of the records. A first record stored within a selected one of the partitions is associated with one or more other records included within one or more different ones of the partitions based on index values stored within the first record and the one or more other records.

Still another embodiment relates to a data processing system. The data processing system includes a database to store records that each includes an index value. A database management system coupled to the database creates multiple partitions that each includes a subset of the records. The database management system links one or more records from one partition each to one or more other records in one or more other partitions.

A further embodiment includes a database management system for managing a database. The system comprises partition creation means for creating multiple partitions, each including respectively associated records, wherein ones of the records store information for locating one or more associated records included within one or more other partitions. The system further includes partition searching means for searching one of the partitions in attempt to locate one or more records identified by a query. The partition searching means uses information stored within a located record to locate all associated records stored within any of the partition of the database.

Other scopes and aspects of the invention will be apparent to those skilled in the art from the following description and the accompanying drawings.

DETAILED DESCRIPTION OF THE DRAWINGS

The following description provides exemplary embodiments of the current invention, which is a system and method for allowing multiple partitions within a database to be cross-linked. The exemplary embodiments focus on the inventive system and method as it may be employed within a database management system. However, the invention may be adapted for use with hierarchical database management systems, knowledge based systems, decision support systems, and data warehouses. In general, any other type of system that uses multiple B-trees or B+-trees as its data structures may usefully employ the invention. This may include spell checkers, spreadsheets, or any other similar application maintaining sorted data.

Figure 1:
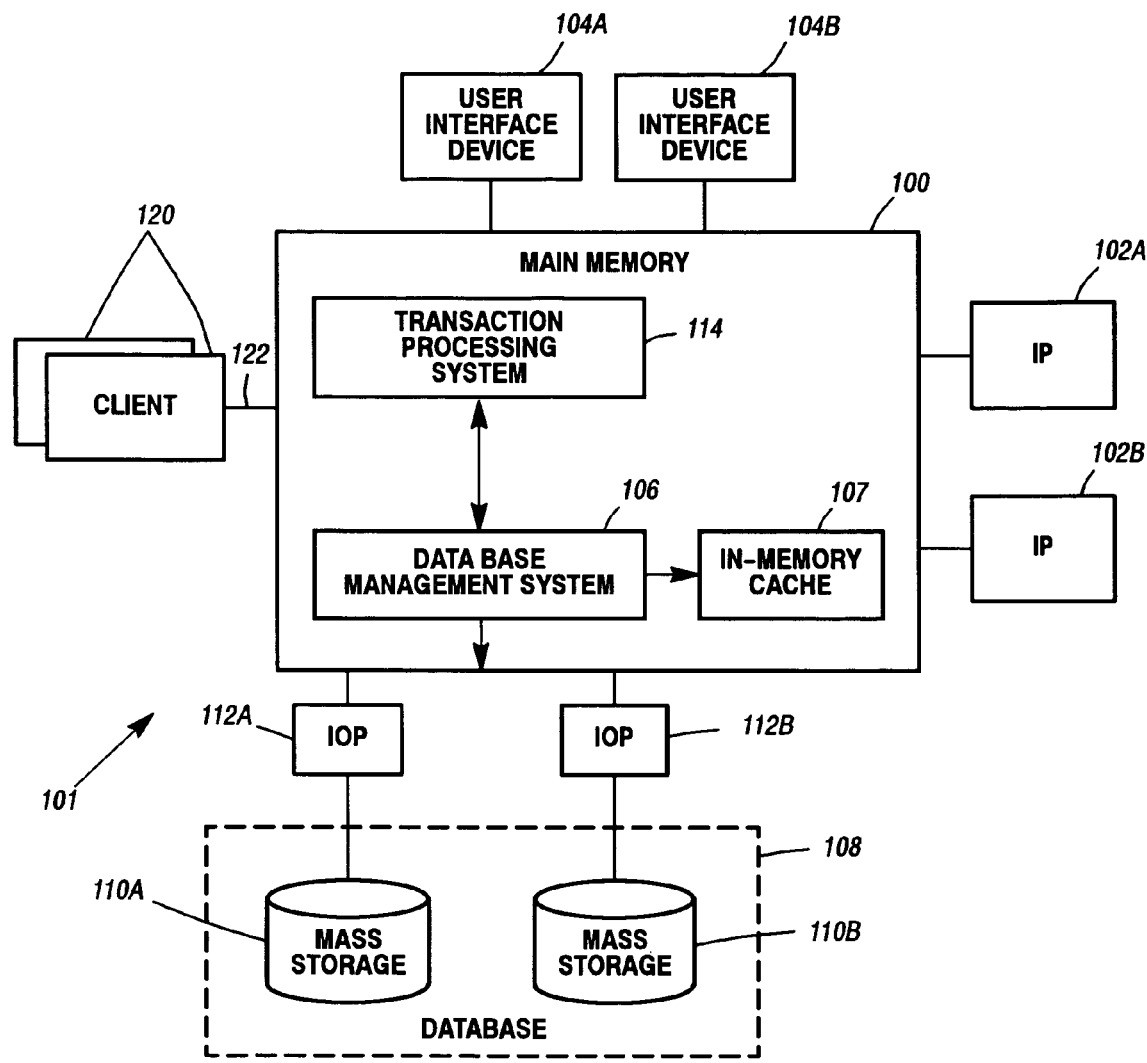
FIG. 1 is a block diagram of an exemplary data processing system 101 that may usefully employ the current invention.

FIG. 1 is a block diagram of an exemplary data processing system 101 that may usefully employ the current invention. The data processing system may be a personal computer, a workstation, a legacy-type system, or any other type of data processing system known in the art. The system includes a main memory 100 that is interactively coupled to one or more Instruction Processors (IPs) 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A DataBase Management System (DBMS) 106 is loaded into main memory 100. This DBMS, which may be any DBMS known in the art, manages, and provides access to, a database 108 (shown dashed). The database may be stored on one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for storing multiple copies of the same data redundantly on multiple hard disks to improve efficient retrieval of the data, and to increase fault tolerance. Battery back up may be provided, if desired. The transfer of data between mass storage devices and DBMS is performed by Input/Output Processors (IOPs) 112a and 112b.

A transaction processing system 114 may be coupled to DBMS 106. This transaction processing system receives queries for data stored within database 108 from one or more users. Transaction processing system formats these queries, and then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from the data processing system.

It will be appreciated that the system of FIG. 1 is merely exemplary, and many other types of configurations may usefully employ the current invention to be described in reference to the remaining drawings.

Figure 2A:
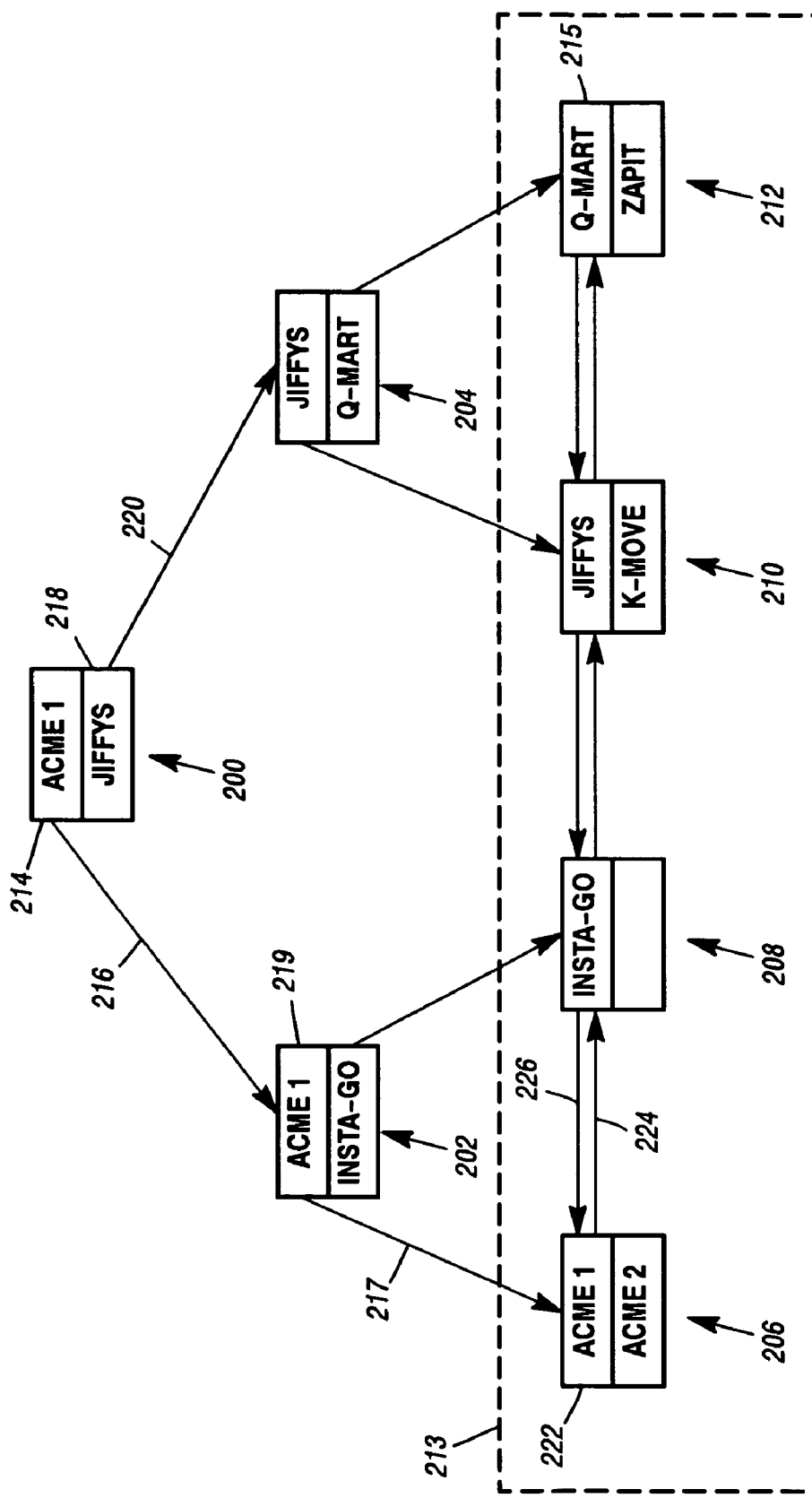
FIG. 2A is an exemplary B-tree of the type that may be used to represent a database table.

FIG. 2A is an exemplary B-tree of the type that may be used to represent a database table. This tree includes a non-leaf root node 200, and two non-leaf nodes 202 and 204, which are children of non-leaf node 200. The tree further includes four leaf nodes 206, 208, 210, and 212, shown collectively as leaf nodes 213 (dashed). Thus, the tree includes three hierarchical levels in this simplified example. It will be understood that many more hierarchical levels may be included in a typical B-tree.

Root node 200 is shown to include two records. Each record stores an index value and a pointer or any other indicia identifying the child nodes. For example, record 214 stores the index value "ACME1" and the pointer 216. Similarly, record 218 stores index value "JIFFYS" and pointer 220. The index values are used to search the tree. In the current implementation, records having index values greater than, or equal to, "ACME1" but less than "JIFFYS" are located using the pointer 216 stored in record 214. Similarly, all records having index values greater than "JIFFYS" are located using pointer 220.

In a manner similar to the foregoing, the tree may be traversed from the root node down to the lowest, leaf-node, level of the tree. The leaf nodes 206, 208, 210, and 212 store at least one record for each of the index values. In the current scenario, it will be assumed that each of these index values corresponds to a business name, and the corresponding one or more records within the leaf node stores information about the business. For instance, leaf node 206 stores a record 222 having the index value "ACME1", which will be assumed to store information about a business having the name "ACME1".

Several embodiments of the B-tree exist to organize and manage the actual data. In one embodiment, information stored within a leaf node may be the actual data records themselves. For instance, assume the database stores sales records for the businesses represented by the index values. In this case, the records stored within the leaf nodes may contain this sales information. In another embodiment, leaf node records may each contain information to allow a user to locate the respect sales data. For example, record 222 may contain a pointer that points to the record containing the sales data for "ACME1".

In one embodiment, each of the business names such as "ACME1" uniquely identifies a record. That is, at most one record exists within the leaf nodes for "ACME1". The business name field is therefore referred to as a "primary key" or "primary index" value. A B-tree that is organized based on a primary key field is referred to as a primary key B-tree.

In another scenario, the business name "ACME1" may be associated with multiple records. For example, consider the case wherein the business "ACME1" has one or more branch offices, each associated with a respective record stored within the leaf nodes. In this case, the business name field is a "secondary index" that does not necessarily uniquely identify a record. A search on this field may locate multiple records. Some unique identification field (i.e., a primary key) is then used to select one of these records as the record of interest. For example, a unique branch office identifier may be used for this purpose. A B-tree organized using secondary index values is referred to as a secondary index B-tree.

A secondary index B-tree may be associated with a primary index B-tree. In this type of scenario, a search may be conducted for a particular business. When multiple records are located, a primary key value is obtained from one of these records. A search of the corresponding primary key B-tree may then be conducted using this primary key value (e.g., a branch office identifier) to obtain a data record for the business branch office of interest. This use of primary key B-trees in conjunction with corresponding secondary index B-trees will be discussed further below.

As may be appreciated, the tree of FIG. 2A may appear in various configurations. For instance, the tree may include fewer hierarchical levels, or many more such levels. Each of the nodes may include fewer records, or many more records. Moreover, rather than storing the index value for a first record on an associated child node, a parent may store a index value for a last record on the child node. For instance, record 214 currently stores the index value "ACME1", which corresponds to the index value stored within the first record of child node 202. In an alternative embodiment, node 200 may store the index value "INSTA-GO", which is the last record stored on the child node, and so on.

In another embodiment, adjacent leaf nodes are linked so that a search may be conducted at the leaf-node level. For instance, leaf node 206 may store pointer 224 pointing to leaf node 208, and so on. In a similar manner, pointers may be stored in addition to, or instead of, these rightward pointers to allow a search to be conducted in the opposite direction. For instance, leaf node 208 may store a pointer 226 to leaf node 206 to allow a right-to-left search to be conducted.

When a new record is added to the tree, a search will be conducted to determine the leaf node that stores the index ranges that will include the index of the new record. If that leaf node is not yet full, the record will be inserted within the located leaf node. Otherwise, another node will be created, and some of the records from the original leaf node will be moved to the new node so that the new record can be stored on one of the two resulting nodes. This type of operation requires modifying data stored within the non-leaf parent nodes that point to these leaf nodes, and may further require the creation of additional non-leaf nodes.

In one embodiment, when non-leaf and leaf nodes are created to facilitate addition of a record, the added nodes are each allocated a predetermined amount of storage space by the database management system. This predetermined amount of storage is referred to as a "page". The size of a page is determined by the database administrator. Within a tree, each leaf node is typically allocated the same amount of storage space as every other leaf node in the tree. Similarly, each non-leaf node is allocated the same amount of storage space as every other non-leaf node in the tree. Leaf nodes may, but need not, be the same size as non-leaf nodes. For purposes of the remaining discussion, the term "nodes" and "pages" will be used interchangeably.

Depending on the how many businesses are being tracked by the database, the tree of FIG. 2A may become prohibitively large. This can result in excessive delays when performing searches. Moreover, the tree may grow to a size that cannot be accommodated by storage constraints. Another problem involves a situation wherein one or more of the non-leaf nodes become corrupted, making the entire tree unavailable. One way to address these concerns is to divide the database into addressable portions called partitions. This involves building multiple B-trees, each corresponding to a portion of the records stored within the database. The portions can be determined based on a hash function, or on some ranges of values stored within one or more columns of a record.

Figure 2B:
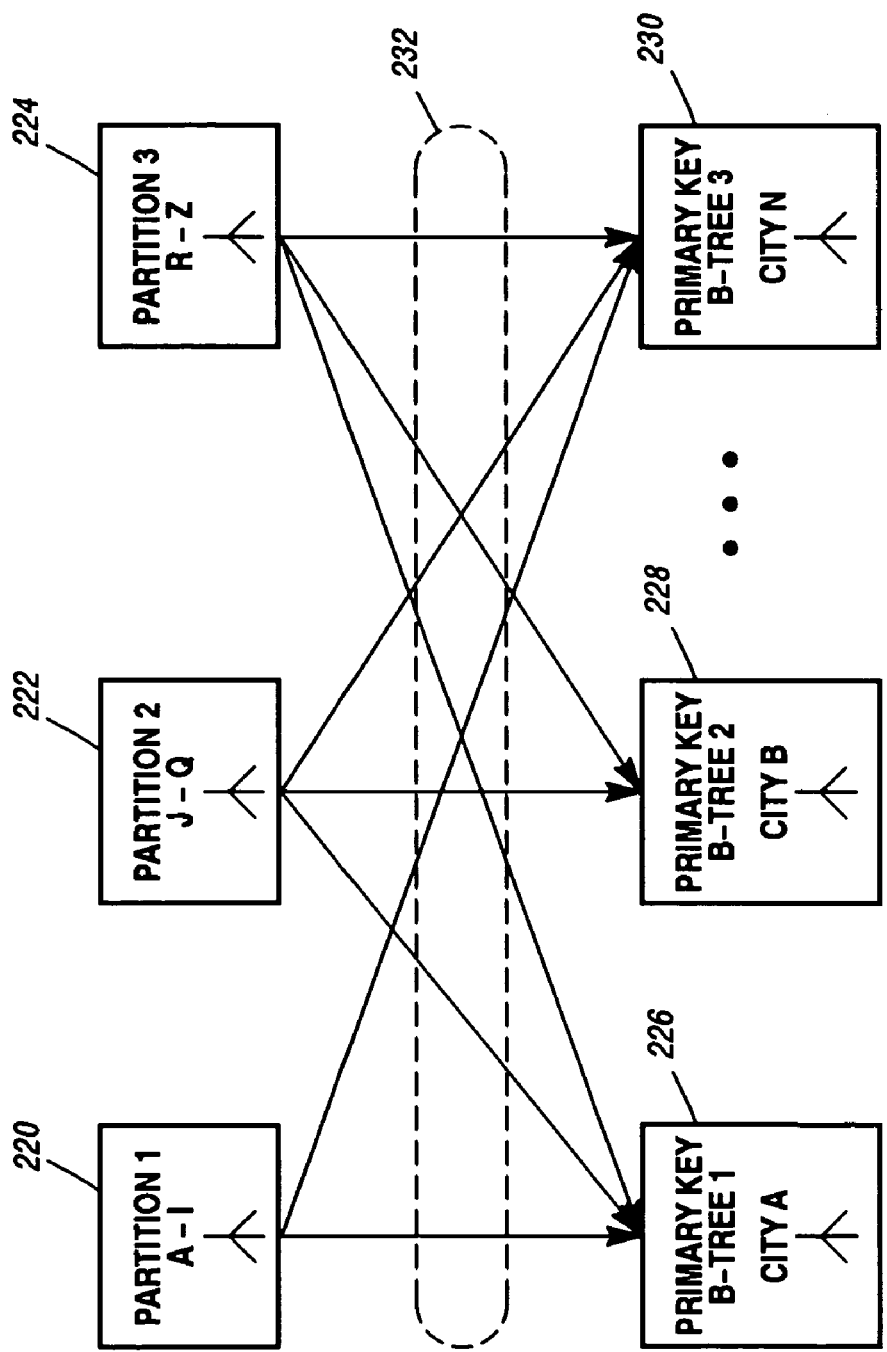
FIG. 2B is an exemplary B-tree illustrating one embodiment of a multi-partition database.

FIG. 2B provides one embodiment of a system for managing multiple partitions 220, 222, and 224 of a database. More or fewer partitions may be provided in other embodiments. Partition 220 includes a B-tree for all records having business names that, when arranged alphabetically, fall within the range A through I. Similarly, partition 222 contains a B-tree for all records having business names falling within the alphabetical range of J through Q. The remaining partition 224 contains those names within the range R through Z. When a business name is provided to initiate a search, the appropriate partition is selected for the search based on the corresponding alphabetical ranges. More or fewer partitions may be employed in this manner.

In one embodiment, the B-trees of partitions 220, 222, and 224 are secondary index B-trees that are arranged according to a secondary index field. Each of these partitions 220, 222, 224 is further associated with one or more primary key B-trees shown in blocks 226, 228, and 230. After a search of a secondary index B-tree within a partition locates one or more records having a desired secondary index value, a primary key value is selected from one of these records and used to search a corresponding one of these primary key B-trees to locate the data.

The foregoing can best be understood by example. Assume that a search is initiated within partition 220 for records for "ACME1". Multiple records are located. One record is selected based on information contained in these records. For instance, assume each record includes a field that indicates a location of the respective branch office represented by that record. One of the multiple records is selected based on the location information included in this field. The selected record will be assumed to describe the branch office located in City A. Next, a primary key value uniquely identifying the branch office is retrieved from a primary key field of this selected record. This key value, which may be an alphanumeric character string, is then used to search the primary key B-tree that is used to manage the records for all businesses in City A, shown in block 226. If the branch office of interest had instead been located in City B, the primary key B-tree shown in block 228 would have been searched, and so on. The primary key B-tree may store the actual data record, or may store a pointer to the data record. In either case, the search of the primary key B-tree is initiated to retrieve the data record.

It will be readily appreciated that when primary key B-trees are maintained in addition to the secondary index B-tree, increased overhead is incurred. When a record is added to the database, both a primary key and secondary index B-tree must be updated to reflect this addition. Similar updates are required when a record is deleted. However, the use of the primary key B-trees makes searching more efficient in various situations.

The solution shown in FIG. 2B provides important advantages over that of FIG. 2A. Each of the individual partitions shown in FIG. 2B may be accessed independently. As such, if a single partition becomes unavailable or corrupted, searches may continue in the other partitions. Moreover, each of the partitions can be individually backed-up, deleted, populated, restored, and so on, increasing system parallelism and maintainability. Additionally, this solution allows for the storing of very large amounts of data since each partition may be assigned a separate storage area.

One limitation associated with the mechanism of FIG. 2B involves the fact that the secondary index B-trees of FIG. 2B are considered "global" B-trees. That means that each of these B-trees may contain information related to all of the primary key B-trees. For instance, a record stored within partition 220 may contain a primary key value mapping to any of the primary key B-trees. This is represented by arrows 232. As a result, if a primary key B-tree is deleted, all of the secondary index B-trees must be updated. For example, if it is determined that all records for City A are to be deleted, all of partitions 220, 222, and 224 must be updated to delete all records for City A.

One way to address this type of situation is to provide a one-to-one correlation between the secondary index and primary key B-trees. For instance, a secondary index B-tree may be created for City A that has a one-to-one correspondence with the primary key B-tree for City A. All records stored within the leaf nodes of the secondary index B-tree will be associated with branch offices in City A. Together, the secondary index and primary key B-trees are considered part of the same partition, which is dedicated to storing records for businesses in City A. If it becomes desirable to delete all records for City A, the partition for City A is merely deleted without requiring any modification to other partitions. In this type of arrangement, the secondary index B-trees are referred to as "local" secondary index B-tree since they only describe the records in their associated primary key B-tree rather than describing records in all primary key B-trees, as would global secondary index B-trees.

One challenge associated with providing the one-to-one correspondence between B-trees in the foregoing manner involves the fact that this arrangement may require the initiation of multiple searches because the partition that is to be the target of the search cannot initially be determined. For instance, assume that when the search for a particular branch office of ACME1 is initiated, the city in which the office resides is unknown such that the partition cannot be selected. In this case, searches of multiple partitions will likely be necessary before the desired branch office is located. A similar situation arises if, after information for a branch office in one city is located, it is then necessary to locate information for one or more other branch offices of the same business. Again, this involves searching additional partitions. This type of scenario is optimally handled by another embodiment of a partitioned system shown in FIG. 3.

Figure 3:
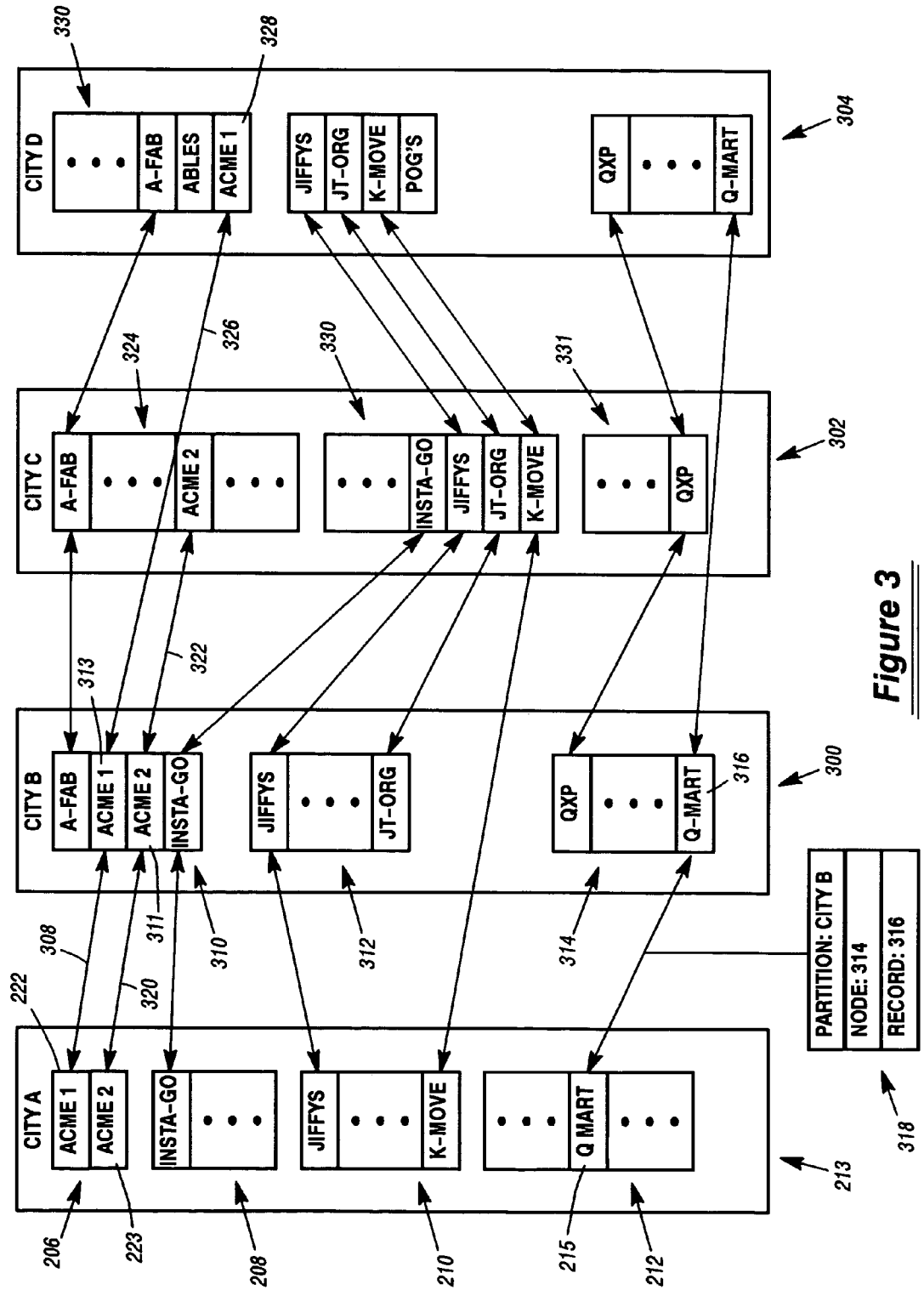
FIG. 3 is a block diagram illustrating a partitioned database in which leaf nodes of various partitions are linked according to one embodiment of the current invention.

FIG. 3 is a block diagram illustrating a partitioned database in which leaf nodes of various partitions are linked according to one embodiment of the current invention. Four secondary index partitions are represented by FIG. 3, each containing a respective secondary index B-tree.

For clarity, only the leaf nodes of each of the secondary index B-trees are illustrated. For instance, the leaf nodes of the "City A" partition are illustrated in block 213. The remaining non-leaf nodes are omitted for simplicity. In a like manner, the leaf nodes of the "City B", "City C", and "City D" partitions are shown in blocks 300, 302, and 304, respectively. For ease of readability, the primary index partitions are not shown, although these partitions are illustrated in remaining ones of the drawings.

As may be appreciated, the partitioned database of FIG. 3 continues the foregoing illustration wherein each of the partitions tracks information for businesses in the respectively associated city. For instance, partition 213 tracks businesses in City A, partition 300 describes businesses in City B, and so on. Many of the represented businesses have branches within more than one city. For example, ACME1 has branches within City A, City B, and City D, as reflected by the fact partitions 213, 300, and 304, respectively, store records for this business. Similarly, JIFFYS has branches in all cities, as indicated by the fact that each of the partitions stores at least one record for this business.

Next, assume that a user performs a search on the City A partition 213 to locate ACME1. When the user locates record 222, the user determines from information stored within the record that information for a different branch office must be obtained. Typically, this would require initiating a search on one or more of the other B-trees for the other partitions 300-304. In a large database with many partitions, this may be very time-consuming, especially if a user is unsure which partition contains the required data. Moreover, in some cases, the user may issue a query that solicits the return of all records having the particular secondary index value.

To make the above-described tasks more efficient, the current system and method maintains links between multiple B-trees. For instance, information represented by pointer 308 is stored in the ACME1 record 222. This information links record 222 of the City A partition to ACME1 record 313 of the City B partition. In one embodiment, pointer information may also be stored within record 313 to allow a user to traverse in the other direction from the ACME1 record of the City B partition to the ACME1 record of the City A partition. In this case, the pointers are bi-directional, and the records are said to be doubly-linked. Alternatively, the pointers may be uni-directional such that searching may only traverse in a rightward or leftward direction. This type of embodiment is discussed further below in reference to an archived partitioned database.

Various types of pointer information may be recorded to provide the linking function described above. In one embodiment, the pointer information identifies a B-tree, a leaf node within the identified B-tree, and a record within the identified leaf node. For instance, the information shown in block 318 may be stored within record 215 of the City A partition. This pointer information identifies record 316 of node 314 within the City B partition as including data for the business Q-MART. This pointer information allows a user that has obtained data for the Q-MART of City A to also readily locate and retrieve additional data for the Q-MART in City B. Similar pointer information may be recorded within record 316 of the City B partition to allow the user to traverse in the opposite direction. That is, after the user obtains data for the Q-MART of City B, the user may readily locate similar data for the Q-MART of City A.

The pointer information shown in FIG. 3 is merely exemplary, and many other types of data may be employed instead. For example, an address identifying the storage location of one or more records may be used as the pointer information. Any other type of information that allows one or more records to be readily located may be utilized instead.

In one embodiment, a record stores pointer information that allows a user to traverse to the partition immediately adjacent to the current partition in either the left or right direction. For example, consider ACME2 record 311 of the City B partition. This record may store information represented by pointer 320 that allows a user to traverse to record 223 of the leftward adjacent partition, and may further store information represented by pointer 322 to allow a user to locate the ACME2 record of the City C partition. If either of these adjacent partitions does not include data for ACME2, the associated pointer information will include a null value. For instance, if ACME2 does not have an office within City C, information for pointer 322 stored within record 311 will contain a null value. In this embodiment, because the pointer information is, by default, considered to point to a node within the left and right adjacent B-trees, there is no need to store the B-tree identifier, which may be omitted.

As may be appreciated from the examples of FIG. 3, it is possible that an adjacent B-tree does not store information for a particular business. This is the case for ACME1 record 313 of the City B partition 300. Information for this business exists in the left-hand adjacent partition as indicated by pointer 308, but does not exist within the right-hand adjacent partition. In one embodiment, instead of storing a null pointer in this situation, a pointer stored within record 313 will point to a record within a partition in the right-hand direction that does store information for ACME1. This is represented by pointer 326, which points to record 328 of City D partition 304. If no rightward partition stores any information for ACME1, the pointer information is set to a null value. It may be noted that in this embodiment, the pointer information must identify a partition, since the pointer may be directed to a partition other than an adjacent partition.

In still another embodiment, pointer information may identify a non-leaf, rather than a leaf, node. For instance, assume that in one city, many different branch offices exist for ACME1 such that multiple leaf nodes are required to store all of the relevant records. In this case, it may be desirable to direct the pointer to the non-leaf node that is the closest ancestor for all leaf nodes storing records for ACME1. For example, in FIG. 2, consider the situation wherein an additional leaf node is inserted at the left-hand side of the tree. This new leaf page is entirely dedicated to storing records for ACME1. This leaf node is pointed to by a record that is inserted on non-leaf node 202 before record 219. Rather than storing pointer information within record 313 of the City B partition 300 to either the new leaf node or to leaf node 206, this pointer may instead be directed to non-leaf node 202, which is the nearest ancestor for both the new leaf node and leaf node 206. A pointer stored within the new record of non-leaf node 202 may be used to locate the first (most left-hand) leaf node storing information for ACME1. Links between leaf nodes may then be used to locate all additional nodes storing records for ACME1.

In still another variation of the foregoing, when multiple leaf nodes of a particular partition store a series of contiguous records having the same secondary index value, inter-partition pointer information will always point to either a left-most or a right-most one of the records in the series. This allows pointers between the leaf nodes to be used to locate the additional node(s) containing relevant information. For instance, if rightward pointers are used to link leaf nodes, inter-partition pointer information optimally directs pointers to a left-most record in any series of records having the same secondary index value. The rightward leaf node pointers can then be used to easily locate the additional leaf nodes that store the series of records. Similarly, if leftward pointers are used between leaf nodes, inter-partition pointer information optimally points to a right-most record in a record series.

As may be appreciated, when records of different partitions are cross-linked in the foregoing manner, additional steps are required to insert a record into a B-tree. For instance, assume a record for K-MOVE is being inserted into the City B partition 300. First, the associated B-tree is searched starting at the root node to locate the insertion point, which will be assumed to be on leaf node 312 for this example. Assuming enough space is available on this node, a record will be created and stored for K-MOVE. If not enough space is available, a new leaf node must be created for the record. The new leaf node is added to the tree by allocating space for the node, creating a link between a parent node and this new leaf node, and, in some embodiments, creating links between this new leaf node and adjacent leaf nodes.

According to the current invention, when a record is added to a partition, links may also be created to one or more other B-trees. For instance, in the current illustration, pointer information will be stored within the new record that was added to node 312 of the City B partition. In an embodiment that provides right-to-left pointers, this pointer information will link this new record to the K-MOVE record stored on node 210 of the City A partition 213. In an embodiment that provides left-to-right pointers, pointer information will link the new record with the K-MOVE record on leaf node 330 of partition 302. If both right-to-left and left-to-right pointers are provided, the new K-MOVE record will be doubly linked to the other partitions.

It may be noted that providing the pointers to other partitions will require a search of both partitions 213 and 302 to locate the records, if any, having the desired secondary index value. In an embodiment that allows for the linking of records within non-adjacent partitions, if either of these adjacent partitions does not include a record for K-MOVE, the next closest partition, if any, is searched to locate a record to which the new record will be linked. This type of situation is illustrated by pointer 326 that links ACME1 record 313 of partition 300 to a counterpart record in partition 304. It may be appreciated that the search continues with additional adjacent partitions so long as no record having the desired index value is located. If a partition at an end of a database is encountered and the index value is still not located, pointer information is set to a null value.

As previously described, in an embodiment wherein records are doubly-linked, after a record is added, previously existing records are updated to store pointer information to the new record. For instance, in the current illustration, the K-MOVE record on leaf node 210 of partition 213, as well as the K-MOVE record on leaf node 330 of partition 302, must be updated with pointer information that is directed to the new K-MOVE record that has been added to node 312 of partition 300. Although double linking partitions in this manner allows the various partitions to be more easily accessed, this process is also more time-consuming to maintain since, generally, records within three different partitions must be updated to accomplish the record insertion.

When records are added to a B-tree in the foregoing manner, it may be necessary to add one or more nodes to the B-tree. For instance, assume that the insertion point for the record appears roughly in the middle of node 312 of the City B partition. Further assume that this node is full. Therefore, a new leaf node is created that is linked into the B-tree by a pointer from a parent node in the manner described in reference to FIG. 1. Some of the records from previously-existing leaf node 312 will be copied to this new leaf node. For instance, according to one embodiment, the node may be added "after" leaf node 312 and roughly half of the records previously stored at the end of leaf node 312 may be moved to the beginning of this new node, allowing room to insert the new record on either the existing or newly-created node. Similarly, the new leaf node may be added before leaf node 312, and the first portion of the records from leaf node 312 may be moved to the beginning of new node. Many mechanisms are known in the art for splitting the node, and the method employed is not particularly relevant. What is important to note is that when records are moved from one node to the next, or are moved to a different location within the same node, any pointer information in one or more other partitions that had been pointing to the re-located records will be outdated.

The foregoing may be appreciated by example. Assume the JT-ORG record of node 312 of partition 300 is moved to a newly-created leaf node within this partition. Pointer information within the JT-ORG record residing on node 330 of partition 302 is now outdated. Assuming doubly-linked pointers are provided between partitions such that the City B record points to the City C record and vice versa, after the JT-ORG record of partition 300 has been re-located, pointer information in that record may be used to locate the counterpart record within partition 302. The JT-ORG record of partition 302 may then be updated so that its pointer information reflects the new location of the partition 300 record. In another embodiment wherein one or more pointers are not doubly linked, a search must be conducted in one or more adjacent B-trees to locate the associated records so that updates to the pointer information may be completed at the time the record is moved.

In an alternative embodiment, when a record is moved from one node to another, pointer information stored within the records of other partitions that has been affected by the move may be left unchanged. For example, assume record JT-ORG of the City B partition 300 is moved from node 312 to a newly added node, but pointer information within node 330 of the City C partition 302 is not updated. When a search attempts to use this outdated pointer information stored in the City C partition to locate the JT-ORG record within the City B partition, a "missing value" situation will arise. That is, a record will be located that does not store the desired secondary index value. As a result, additional searching must be initiated on the City B partition to determine whether a record storing the desired secondary index value exists. This search may be conducted in one of several ways depending on the embodiment.

In one scenario, if pointers are maintained between the leaf nodes of the B-tree, these pointers may be used to find newly added nodes. For instance, assume that when a new node is added to a B-tree, this node is always added after the existing node that has become full. The added leaf node is then linked to the original leaf node using a pointer, as shown in FIG. 2. When a search attempts to locate records that had previously been stored on the existing node, but which now reside on the new node because of a node split, the "missing value" situation arises. As a result, the search will first determine whether the record of interest was merely moved to a new location on the node. If this search of the originally-existing node does not locate the record, the pointers between leaf nodes may be used to attempt to find a rightward leaf node that does store the record of interest. If the record does exist, it is known that it will appear to the right of the previously-existing node because new nodes are always added after (that is, to the right) of the existing node. The search can be terminated after a record is encountered that stores a secondary index value that is larger than the index value which is the target of the search.

In some cases, a large group of contiguous records may be added to a B-tree. This may involve adding multiple contiguous leaf nodes to the B-tree. In these situations, more than one leaf node may have to be traversed when a "missing value" situation is encountered. Further, in other embodiments wherein the leaf-node pointers are not available to expedite the search following a "missing value" scenario, the search of the adjacent B-tree must be initiated from the root node.

The foregoing discussion primarily focuses on the movement of records from one node to another. However, as previously mentioned, records may also be moved to a different location within the same node. This situation may be handled in any of the ways discussed above. That is, the pointer information within adjacent B-trees may be updated at the time the record is moved, or may instead be updated later when a search results in a "missing value" situation. As will be appreciated, when the "missing value" condition arises, the node that is identified by the outdated pointer information will be searched first before traversing to another node. This will efficiently determine whether the record was merely moved to a new location within the same node or has been deleted. If the record is indeed located at a different location within the same node, the outdated pointer information is updated to reflect this new location.

The above description discusses the addition of records and nodes. Entire partitions may also be added to the database. These partitions may be added at the "edge" of the data-base or between two existing partitions. For instance, a partition for City E may be added at the right edge of the database represented by FIG. 3 "after" the partition for City D. Alternatively, a partition for City B2 may be added between the City B and City C partitions. In either case, after a partition is created, nodes are added to the partition in the manner discussed above. Root and intermediate nodes are created to store index values and pointers that may then be used to search for leaf nodes storing, or otherwise identifying, the data records. As data records are added to the database, searches are conducted within the adjacent partitions to create the inter-partition links in the manner discussed above.

As changes are made to a database, records are not only added, but may also be deleted. In one embodiment, before a record is deleted from a partition, any pointers that link that record directly to other records of a different partition are used to locate the records in those other partition(s). These other records are updated to reflect deletion of the record, and then the record of interest may be deleted. For example, assume that record 311 for "ACME2" is being deleted from leaf node 310 within the City B partition. Pointer 320 will be used to locate the record for ACME2 on node 206 within the City A partition. Assume further that these records are doubly linked as shown in FIG. 3 such that the ACME2 record on node 206 contains a pointer to record 311 of the City B partition 300. This pointer directed to record 311 will be set to a null value in an embodiment wherein the pointers are strictly pointing to adjacent B-trees. This indicates that the adjacent B-tree to the right of the current B-tree does not contain a record for ACME2. In an alternative embodiment wherein pointers may be directed to a non-adjacent B-tree, the pointer in the ACME2 record of the City A partition may instead be re-directed to point to a record in the next closest B-tree in the right-hand direction that stores information for ACME2.

In an embodiment wherein pointers may be directed to non-adjacent B-trees, information stored within the record that is to be deleted may be used to update the pointers in the records residing within the other partitions. For instance, the pointer information stored within the ACME2 record 311 foil City B that points to the associated ACME2 record for City C may be stored within the ACME2 record on node 206 for the City A partition. Similarly, information stored within the ACME2 record for City B that points to the ACME2 record for City A may be stored within the ACME2 record for City C. Thus, the City C record will point to the City A record and vice versa. After these updates are made, the record for City B may be deleted.

In still another embodiment, a record may be deleted without changing the pointers in the associated records. For example, ACME2 record 311 may be deleted without updating the ACME2 records for City A or City C such that the pointer information within these associated records is now outdated. When a search attempts to use this outdated pointer information to locate an ACME2 record within the City B partition, a "missing value" situation will arise. As a result, the search must be initiated on the adjacent B-trees. For instance, if the search attempts to go from the City A B-tree to the City B B-tree, the ACME2 record will not be located because the pointer information is outdated. A search must therefore be initiated on the City B B-tree. According to the current example, no corresponding record will be located. Another search will therefore be initiated on the City C B-tree, resulting in the location of the ACME2 record on node 324. At this time, the pointer information within the AMCE2 records of the City A and City C B-trees may be updated to reflect the prior deletion of the record within the City B B-tree.

When records are deleted from one or more leaf nodes, adjacent nodes may become relatively unpopulated such that it is desirable to merge more than one node into a single node. In this case, records are moved from one node to another. Pointer information stored within other partitions that point to the re-located records becomes obsolete. This situation can be handled in any of the ways previously discussed above in reference to the addition of nodes. Specifically, pointers in the other partitions can be updated at the time the records are moved, or can remain obsolete until the use of these pointers results in a "missing value" situation. At that later time, additional searching will be initiated to locate another record having the target secondary index value so that the pointer information may be updated.

Entire partitions may be deleted from the database, if desired. To accomplish this, all records within the partition are deleted using any of the mechanisms discussed above. Any pointer information that is made obsolete by operation may be updated at the time of partition deletion, or at some later time when use of this information results in a "missing value" condition.

The partitions shown in FIG. 3 are created by grouping records according to the information stored within a particular "City" column of the record. That is, all records having "City A" stored within the city column are grouped into the City A partition, and so on. Any one or more columns may be used to define the partitions in a similar manner. For instance, partitions may be ordered according to how the cities are related geographically as indicated by latitude and longitude columns in each record. If desired, one or more hash functions may be utilized on data stored within the records to group the records into partitions. In yet another embodiment, some other source such as an external table may be used to order the partitions.

As discussed above, in a partitioned database such as that shown in FIG. 3, each secondary index B-tree may be respectively associated with a primary key B-tree. This is described further in reference to FIG. 4.

Figure 4:
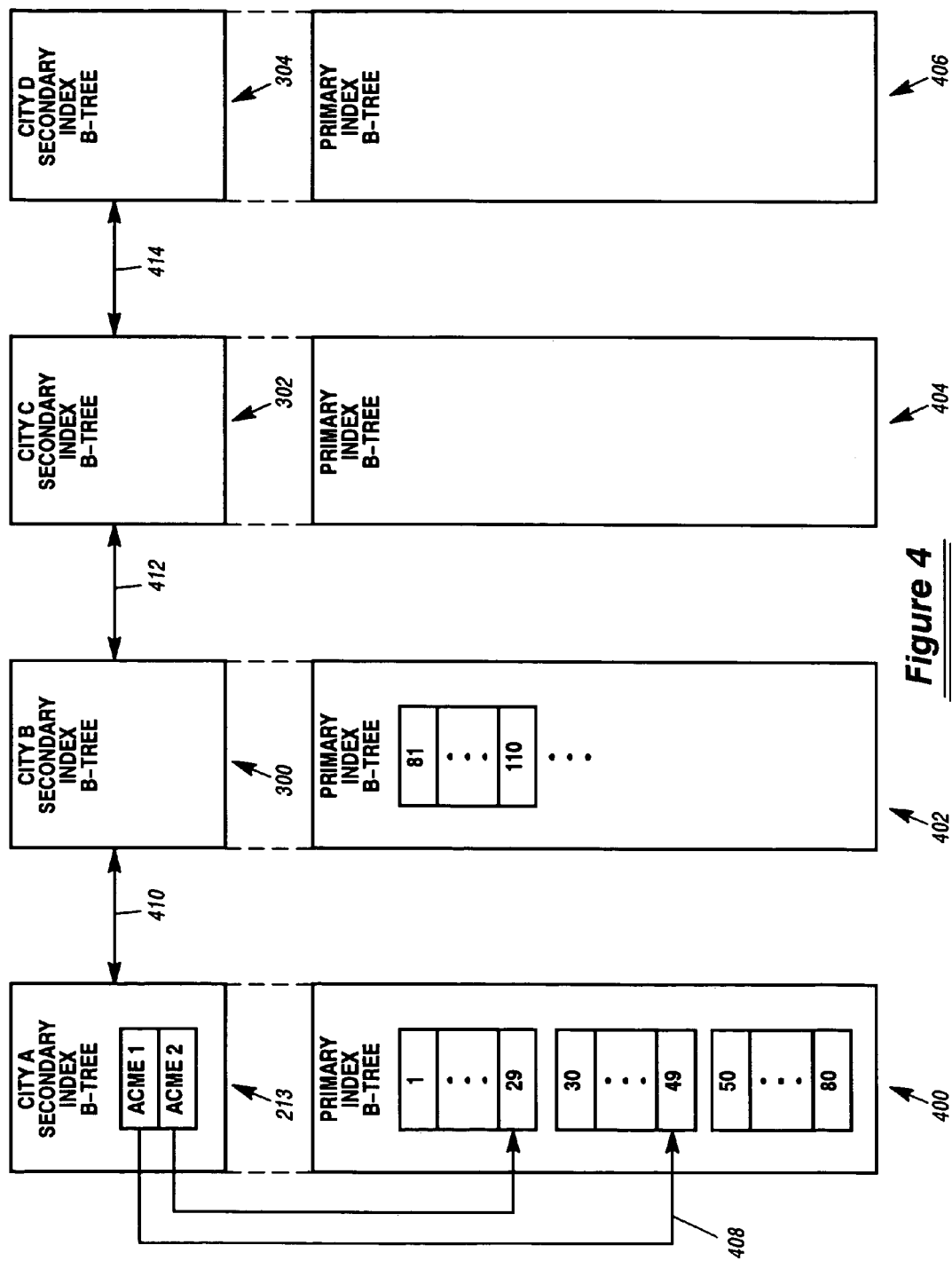
FIG. 4 is a block diagram illustrating a partitioned database in which each of the secondary index B-trees of the database of FIG. 3 is respectively associated with a primary index B-tree according to another embodiment of the invention.

FIG. 4 illustrates a partitioned database in which each of the secondary index B-trees of the database of FIG. 3 is respectively associated with a primary key B-tree. For instance, primary key B-tree 400 is respectively associated with the secondary index B-tree of partition 213, primary key B-tree 402 is respectively associated with secondary index B-tree of partition 300, and so on. After a search on the secondary index locates a record in partition 213, a primary key value contained in this record may be used to search the B-tree of partition 400. This search will locate exactly one record having the primary key value. This record may point to the actual data, or may itself store the data.

In the example, the record for "ACME1" of the City A partition contains the primary key value of "49", which may be used to search primary key B-tree 400 to locate the record identified by this index value, as represented by arrow 408. A similar situation occurs for "ACME2", which stored the primary key value of "29".

The embodiments of FIGS. 3 and 4 provide the advantages of the FIG. 2 embodiment. That is, partitions may be searched and managed independently and in parallel. A partition may be searched even though another partition becomes corrupted or is unavailable. Moreover, each partition may be archived, deleted, populated, restored, and so on, in an independent manner. Because partitions may be stored independently, the database may grow to a virtually limitless size. In addition, the embodiments of FIGS. 3 and 4 provide a mechanism that allows traversal to another partition if a desired index value is not located in the current partition.

The various partitions shown in FIGS. 3 and 4 may be updated at any time. For instance, records may be added and/or deleted to any of the partitions as the need arises. In these types of databases, it is generally advantageous to maintain doubly-linked pointers between the records of the various partitions. For example, returning to FIG. 3, the record for ACME1 in the City A partition points to the ACME1 record in the City B partition and vice versa.

A more special-case embodiment of the foregoing involves an "archive" partitioned database. In this type of database, only a "current" partition may be updated with new records. After some predetermined event has occurred, this "current" partition is made read-only and no further updates may be made to that partition. The event used to trigger creation of a new partition may be the elapsing of a time period, or may be the creation of a predetermined number of records, the creation of a record having a predetermined secondary index value, and so on.

When the previous "current" partition is made read-only, a new "current" partition is created at an edge of the partition range. This partition is initially empty. For a next predetermined time period, or until another predetermined event occurs, all updates are made to the new "current" partition. Records that are added to this new partition are only linked to records in a previous partition. Thus, pointers are always oriented in the same direction. That is, pointers are uni-directional such that records are not doubly linked.

Generally, archive databases utilize a time-related mechanism to determine when the next partition will be created. For instance, at the end of a predetermined time period such as a day, week, or month, the "current" partition becomes the most recent previous partition, which is made read-only. A new "current" partition is created to receive any additional records. In this type of scenario, the index values used to identify records may be time- and/or date-related. Because such index values are increasing, new partitions are generally added to a right edge of the database, and all leftward partitions are considered read-only. In another type of scenario, the data used as secondary index values may be patient identifiers, invoice numbers, employee numbers, or any other type of monotonically increasing or monotonically decreasing identification. If the index values are decreasing, a new partition will generally be added to a left edge of the database, with rightward partitions being made read-only.

Regardless of whether a new partition is added to a right or left edge, the records residing within all partitions except that newly-created partition reflect events that occurred in the past. Therefore, all of these records in the older partitions all are considered read-only. Only the records being added to the newly-created current partition during the current time period may be updated.

As previously discussed, archive databases may effectively use uni-directional links that point from the "current" partition to the most recent prior partition. Each record that is inserted into the current partition may include a link to an associated record within another partition in the manner described above. For instance, in one embodiment, a pointer will always point to an associated record within the partition that immediately precedes the current partition. If no record exists in this adjacent partition, the pointer information is set to a null value. As an example, assume the current partition stores patient medical records created during the current month. When a record is added to the current partition having a particular patient identification number, a pointer may be stored in this record that is directed to a record that resides within the partition adjacent to the current partition. This record within the other partition contains the same patient identifier as the newly-added record. This adjacent partition may store patient records for the previous month, for instance. If such a record does not exist within the adjacent partition, the pointer information within the current record may be set to a null value.

In an alternative embodiment, pointers may be directed to a partition that is other than the adjacent partition. Returning to the foregoing example, if a record does not exist within last month's partition for the patient identifier, the partition storing information for the next preceding month is searched to locate any such record, and so on. When a matching record is found, the pointer information within the current record is set to point to this newly-located record for a previous time period. If all partitions are searched without locating the patient identifier, the pointer information is set to null.

According to the above-described mechanism of managing an archived database, when a new partition is first created, it is empty. Records are then added to this new partition as data is received. When a record is added in this manner, the index value of the record may, or may not, be the same as that of a record in another partition in the database, and this record therefore may, or may not, be linked to another partition.

In an embodiment that is a variation of the foregoing, when a new current partition is created in an archive database, that partition is initially populated with place-holder records. Specifically, a place-holder record is created for each index value that appears within the adjacent partition. For instance, consider the current example wherein partitions include records that utilize patient identification numbers as secondary index values. When a new partition is created, a place-holder record is created within this new current partition for each patient identification number that is an index value of a record stored within the adjacent partition. Each place-holder record contains a predetermined flag or marker that marks it as place-holder records rather than as an actual data record that stores data. This place-holder record does not store any data, but instead stores pointer information that links the record to a data record that stores the same index value as the place-holder record, and that resides within the closest (most recent) partition to the current partition. Thus, each place-holder record is linked to a data record (rather than to another place-holder record) that stores the same secondary index value as the place-holder record, if such a record exists. This will be discussed further below.

In a preferred embodiment, duplicate place-holder records are not inserted into a new partition. For instance, if multiple records exist within the adjacent partition that have the same patient identification number, only a single place-holder record is created to represent this identification number within the current partition. Additionally, a place-holder record is not created in the new partition to represent an index value that is no longer associated with an actual data record. For instance, assume that the adjacent partition stores a place-holder record having the patient identifier "100". That place-holder record had previously stored pointer information that pointed to a data record in a leftward partition having the same index value. The partition storing the data record has since been deleted, and no other data record exists having the index value of "100". Therefore, a place-holder record is not created for this index value within the new current partition. If a similar situation had occurred but a data record having an index value of "100" did exist within some other partition to the left of the deleted partition, a place-holder record is created within the new current partition.

As mentioned above, each place-holder record stores pointer information that links the record to another data record having the same index value but that resides within a different partition. That is, in a preferred embodiment, a place-holder record in the current partition will hot be linked to another place-holder record in an adjacent partition, but instead is linked to the nearest record to its left that actually stores, or identifies, data. Thus, a place-holder record within an adjacent partition and the place-holder record within a new current partition having the same index value will both point to the same data record in some partition to the left of the adjacent partition. If multiple data records exist having the same index value within a given partition, a place-holder record will point to a predetermined one of these data records. Preferably, this predetermined data record will be the one that can be used to readily locate the additional data records having the same index value. For instance, if multiple leaf nodes exist within a partition that each store records of the same index value and these leaf nodes are linked via one-way pointers, the predetermined leaf node will be chosen as the node appearing first in this linked series of nodes so that the pointers can be used to readily locate the additional records in the series.

Insertion of place-holder records in a new current partition may occur at the same time as data is being stored to records within this partition. Alternatively, place-holder records may be inserted into the new partition during a "cut-over" period. During this cut-over period, data records are not stored to the new partition, but instead continue to be entered into the old "current" partition. In this latter embodiment, after the new "current" partition is fully populated with all required place-holder records, the old "current" partition is made read-only, and all future data updates occur to the new partition. After such time, no more place-holder records may be inserted into the new "current" partition.

When an archive database is utilized, a search for a particular record having a desired index value is always initiated on the current partition first. Assuming a record is located having the desired index value, that record may store pointer information pointing to a target data record within the nearest leftward partition. If the pointer information is still valid, that target data record will have the same index value. If, however, the pointer information has become obsolete because a partition has been deleted, a search must be initiated to obtain the new location, if any, for the target data record. Once the record is located, the pointer information in the current partition may be updated. As previously discussed, the pointer information does not necessarily point to a record in the adjacent partition if that partition stores only a place-holder record for the index value.

In a manner similar to that described above, after a data record having a predetermined index value is located within a partition to the left of the current partition, any pointer information within that data record may be used to locate the next left-most partition storing a data record having the same index value, if any, and so on. When a data record is encountered with "null" pointer information, no leftward partitions contain data records having the desired index value. This situation will arise, for instance, upon encountering the left-most partition. This situation will also occur when a record is encountered that stores a "new" index value that did not appear in previously-created (leftward) partitions.

As may be appreciated from the above discussion, if a search of the current partition does not result in location of a desired index value, the index value does not exist within any other partitions of the database. Further, if the index value is located within the current partition, and the located record contains "null" pointer information, no other partitions contain data records having the index value. That is, the index value first appears in the current partition as a new index value.

As mentioned above, it is possible that when pointer information is used to traverse to another partition to locate a data record having a particular index value, a "missing value" situation may be encountered. Recall that in the embodiments discussed above, a "missing value" situation may occur because of deletion, re-positioning, or modification of records. In the current embodiment, these types of modifications are not permitted in any partition except the current partition, since all other partitions are considered read-only. However, the current embodiment of an archive database does permit the deletion of entire read-only partitions such that pointer information directed to a deleted partition will no longer be accurate, thus resulting in this "missing value" situation.

When a missing value situation occurs in the current embodiment, a search is initiated on the next adjacent partition in the search direction for a record having the target index value. In a typical embodiment wherein a search is proceeding leftward, this search will be conducted on the leftward adjacent partition. If a record having the desired target index value is not located within this partition, it is known that no other leftward partition stores the index value. Recall that this is so because of the use of the place-holder records. If, however, a place-holder record is located, that place-holder record may be used to locate the nearest data record.

If a missing value situation occurs as a result of outdated pointer information stored within the current partition, that pointer information may be updated based on the results of the search. That is, if no record is located in the adjacent partition, the pointer information within the record of the current partition may be set to "null". If, however, a place-holder record is located in the adjacent partition, the pointer from this located record may be used to update the pointer information within the record of the current partition. If a data record is located, the pointer information within the record of the current partition is updated to point to this data record. If the missing value situation instead occurred because of outdated pointer information stored within one of the read-only partitions, the pointer information cannot be updated, and will remain obsolete within the read-only partition.

As previously mentioned, partitions may be deleted within the archive database. Generally, in an archive database, only the partition at the far left edge of the database will be deleted as it becomes outdated. The database is therefore maintained as a "moving window" that continually stores more "recent" data. In contrast, a partition having even one other partition to its left may be, but is generally not, deleted. As discussed above, when a partition is deleted, any obsolete pointer information that is stored within the current (read/write) partition may be updated, if desired. However, if the partition deletion caused pointer information within any read-only partitions to become obsolete, this outdated pointer information in the read-only partitions must be left unchanged.

In yet another scenario, upon locating a record in the current partition, pointer information stored within the record may be directed to another partition that is unavailable because it is locked by another query. Therefore, the current query will only be able to return partial results. To obtain any other records in other partitions having the desired index value, the partition to the immediate left of the unavailable partition is searched. If this search does not locate a record having the desired index value, it may be assumed that the data for that index value occurs for the first time in the unavailable partition. Therefore, no additional records are contained within the database for the desired index value. If, however, the index value is located within the partition immediately to the left of the unavailable partition, the index value will be located within either a place-holder record or a data record. If the index value is located within a data record, the record may be retrieved for return in the query, and the pointer information within this record may be used to continue the search in the leftward direction. If the index value is located in a place-holder record, the pointer information may be used to continue the search. In any event, the query must be completed at a later time to retrieve any records within the unavailable partition having the desired index value, or, alternatively, partial results may be returned to the user.

As discussed above, when data is stored within the database, it is always added to the current partition. This is accomplished by searching on the index value to locate the corresponding place-holder record. This record is then updated to reflect that it is no longer a place-holder record, but instead stores data. This may be accomplished by disabling a place-holder flag or marker, for instance. This record is already linked to any existing record in a different partition because of the pointer information that was stored within the place-holder record at the time the current partition was created. It may be noted that if data has already been stored within the current partition for a given index value, the place-holder record will not be located. Instead, a data record will be located. Any new data record will then be added to the current partition in a predetermined proximity to this previously-added record having the same index. Generally, any additional record will be added after the most recently-added data record having the same index value. If the new data record must be added to a different leaf node because the current leaf node is full, that leaf node is preferably linked to the previous leaf node, thereby facilitating a search for a series of records having the same index value.

In one embodiment, each record in a series of data records that have the same index value and that are stored within the same partition will store pointer information directed to a data record of another partition that stores the same index value. In another embodiment, only a predetermined one of the record series, such as the first or last record of the series, stores this inter-partition pointer information.

Sometimes, when a search is conducted to locate a particular index, neither a place-holder nor a data record will be located. In this case, a new data record is created at the appropriate insertion point within the current partition. Since the search did not locate a placeholder or a data record having the desired index value, it is known that a record having this index does not exist within any other partition of the database. Therefore, the pointer information for this data record may be set to "null".

Data records may also be deleted from the current partition. In this case, the record of interest is located. If this record is the last data record within the partition that stores the index value, the data record is converted to a place-holder record by activating the place-holder flag or marker. If the located data record is not the only record having the index value within the current partition, the data record may merely be deleted. The foregoing concepts are considered further in reference to FIG. 5.

Figure 5:
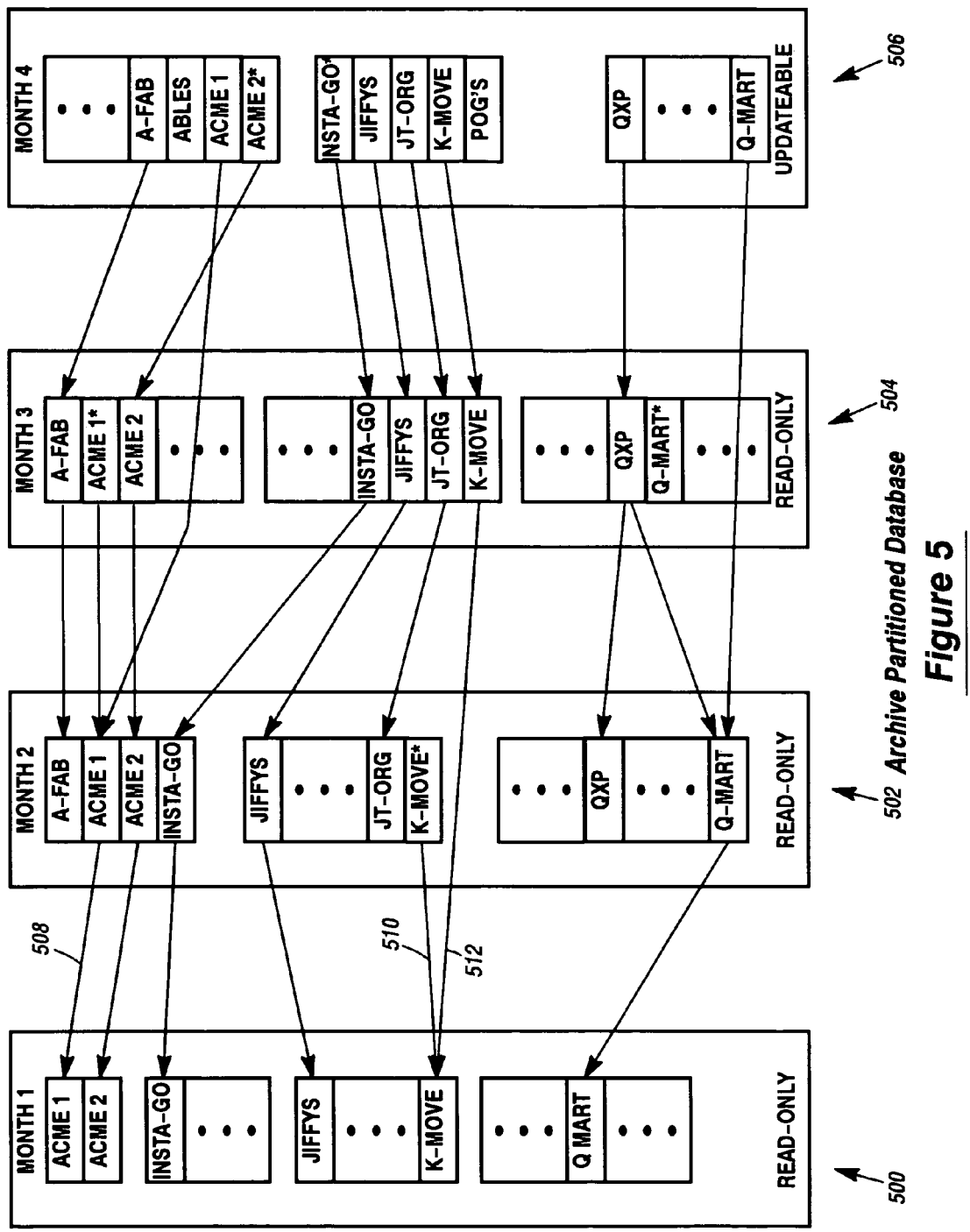
FIG. 5 is a block diagram of a partitioned archived database according to one embodiment of the current invention.

FIG. 5 is a block diagram of a partitioned archived database according to one embodiment of the current invention. This database is very similar to that shown in FIG. 3. The database of FIG. 5 has four partitions, each containing records pertaining to businesses. The business names (e.g., "ACME1", "AMCE2" etc.) are used as the secondary index values. Each partition is associated with a B-tree such as shown in FIG. 1. For ease of reference, only the leaf nodes of this tree are shown.

In FIG. 5, the partitions are created differently than in the scenario of FIG. 3. In particular, whereas each of the partitions of FIG. 3 stores information about business within a respective city, each of the partitions of FIG. 5 store information regarding the businesses for a respective month. For instance, partition 500 stores information pertaining to Month 1, partition 502 stores information about the businesses for Month 2, and so on. For this example, Months 1, 2, and 3 are in the past, and therefore the respective partitions 500, 502, and 504 have been made read-only. It is assumed that the current date falls within Month 4, and therefore partition 506 is the only partition that is updateable.

For illustrative purposes, each partition of FIG. 5 corresponds closely to a respective partition of FIG. 3. For example, partition 500 of FIG. 5 is shown to store data records having the same index values as the records stored within partition 213, partition 502 of FIG. 5 corresponds to partition 300 of FIG. 3, and so on. It may be noted, however, that the various partitions of the archive database of FIG. 5 differ from those of FIG. 3 in that they store place-holder records (as indicated by the asterisks), whereas the partitions of the FIG. 3 database do not. For instance, partition 502 of FIG. 5 includes the place-holder record for business "K-MOVE". This place-holder record is not included within the corresponding partition 300 of FIG. 3, since that database is not an archive database that utilizes such place-holder records.

Several additional observations may be made when comparing the databases of FIGS. 3 and 5. First, all of the inter-partition links of FIG. 3 are bi-directional. For instance, in FIG. 3, arrow 320 points from the ACME2 record of the City B partition to the ACME2 record of the City A partition and vice versa. In contrast, in the archive database of FIG. 5, the arrows are uni-directional. For example, arrow 508 points from the ACME1 record in partition 502 to the ACME1 record in partition 500, but does not point in the other direction. This is because in an archive database, searches generally proceed from the most recent partitions to the progressively older partitions, but not in the other direction.

Additionally, as already mentioned, in the database of FIG. 5, every index value in partition 500 is represented by a record having the same index value in partition 502. For example, even though partition 502 does not store data for the index value "K-MOVE", a place-holder record for this index value is never-the-less created for partition 502 because this index value exists within the adjacent leftward partition 500. This place-holder record stores pointer information pointing to the K-MOVE record of partition 500. As a result, every record in partition 500 is pointed to by a record from partition 502. Similarly, every data record is partition 502 is pointed to by a record in partition 504, and so on. It may be noted that if multiple records existed within a partition having the same index value, only a single place-holder record need be created in the adjacent rightward partition. For instance, if partition 500 stored two data records having an index value of "K-MOVE", only a single "K-MOVE" place-holder record is created within partition 502 when that partition is initialized. Moreover, if place-holder records having an index value of "K-MOVE" exist within both partitions 502 and 504, both of these place-holder records will point to the data record in partition 500. If partition 500 included a series of data records for K-MOVE, both of the placeholder records within partitions 502 and 504 will preferably store information to point to a predetermined one of these data records. For example, both place-holder records may point to the first or last data record in the record series.

It may further be noted that not all index values appearing in partition 502 need also appear in partition 500. For instance, partition 502 includes a record having the index value "A-FAB", which does not appear in partition 500. This may occur when data for a business is stored for the very first time during Month 2, for instance. In this case, the data record "A-FAB" in partition 502 stores pointer information that is set to "null", as represented by the fact that this record is not illustrated as having a leftward pointing arrow in FIG. 5.

Some records may be pointed to by both a place-holder record and a data record. For example, the "K-MOVE" record in partition 500 is pointed to by the "K-MOVE" place-holder record of partition 502 as indicated by the arrow 510, and is further pointed to by the "K-MOVE" data record of partition 504, as indicated by arrow 512. This occurs because when a place-holder record is created in a new current partition having a particular index value, the pointer information within the record is always directed to the closest leftward data record (not place-holder record) within another partition having the same index value, if such a record exists. Therefore, when the place-holder record for "K-MOVE" was created in partition 504, it was initialized with pointer information directed to the "K-MOVE" data record in partition 500, rather than the place-holder "K-MOVE" record stored in partition 502. That record within partition 504 was then subsequently converted to a data record, as indicated by the lack of an asterisk for this record. For this reason, in a preferred embodiment, a place-holder record such as the "K-MOVE" record of partition 502 will not be pointed to by a "K-MOVE" record located in any rightward partition. In an alternative embodiment, the inter-partition links may be created to point to a nearest leftward record having the same index value, regardless of whether that record is a data or a place-holder record. However, this may significantly increase query times, since many partitions storing place-holder records may have to be searched to locate a small number of data records.

As previously described, the B-trees represented in FIGS. 3 and 5 are secondary index B-trees. These B-trees are organized according to secondary index values, which are values that do not necessarily uniquely identify a particular record within the database. For instance, there may be many records within the databases of FIGS. 3 and 5 having the secondary index value "ACME1". Even within the same partition, multiple such records may exist.

In contrast, a primary key value uniquely identifies a record within a database. For instance, assume that each record shown in FIGS. 3 and 5 stores a primary key value that, in this example, is a unique invoice number. No two records within the database store the same invoice number. Thus, the ACME1 record in partition 500 does not store the same invoice number as that stored by the ACME1 record in partition 502. A primary key B-tree may be created in addition to the secondary index B-tree to organize records according to the primary key values. During use, a search may first be performed on the secondary B-tree to locate all records having the same secondary index value, such as "ACME1". The primary key values may be retrieved from these records and used to search the corresponding primary B-tree.

Figures 6, 6A:
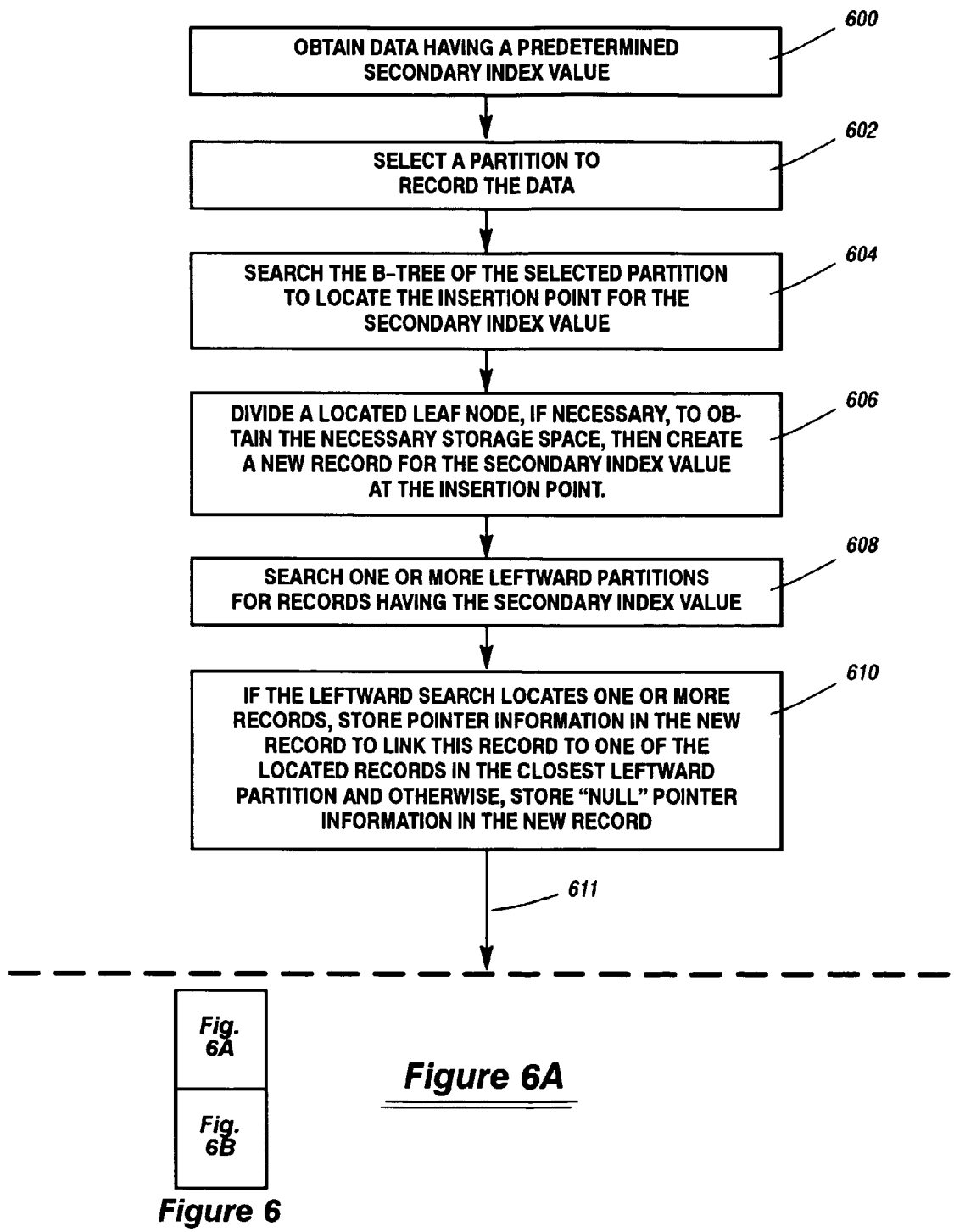
FIGS. 6A and 6B, when configured as shown in FIG. 6, are a flow diagram of one method of adding records to a partitioned non-archived database according to the current invention.
Figure 6B:
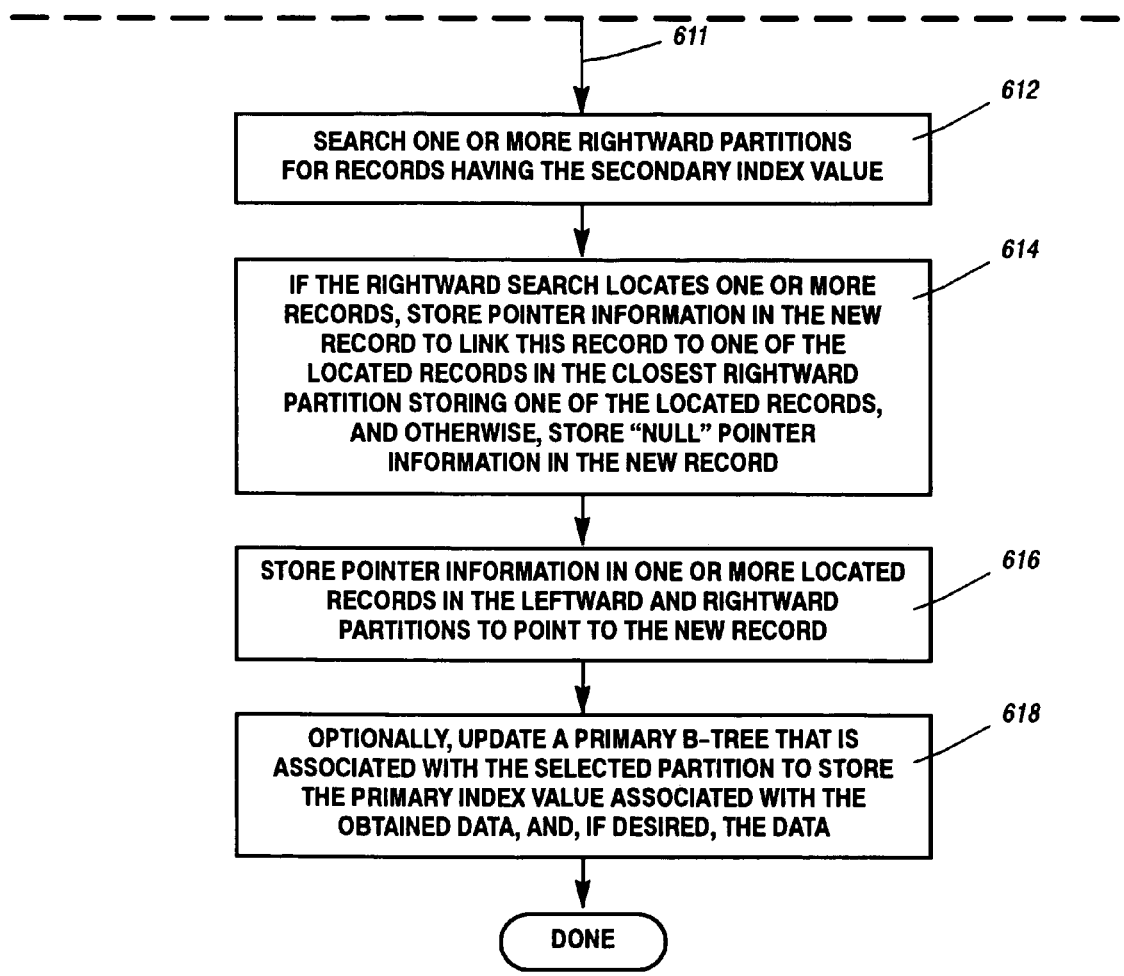

FIGS. 6A and 6B, when configured as shown in FIG. 6, are a flow diagram of one method of adding records to a partitioned non-archived database according to the current invention. First, data is obtained that has a predetermined secondary index value (600). A partition is selected to record the data (602). This partition may be selected with the use of a partition identifier that is provided along with the data. A secondary index B-tree for this partition is searched to locate a node containing the insertion point for the secondary index value (604). A record is created at the insertion point to store the secondary index value (606). This process may involve splitting the located node to make room for the new record.

In one embodiment, a new record stores the secondary index value and/or additional information such as a primary key value for the newly-received data. This primary key value may be used to search a primary key B-tree to obtain an insertion point at which to create a new record storing the actual data, or identifying the storage location of this data. This is discussed further below.

After the insertion point is located, one or more leftward partitions are searched for records having the same secondary index value as was stored in the new record (608). If this search locates one or more such records, pointer information may be stored within the new record to link this new record to a closest leftward partition storing one of the other located records. Otherwise, if no such other records are encountered in this search, pointer information within the new record is set to "null" (610). In one embodiment, the search only attempts to locate a leftward record in the partition immediately to the left of the partition that contains the new record. In another embodiment, the search will continue leftward until a partition containing such a record is located, or until the partition at an edge of the database is searched without locating such a record.

Next, processing continues to FIG. 6B, as indicated by arrow 611. There, the foregoing steps may be repeated in the rightward direction. That is, one or more rightward partitions may be searched for records having the secondary index value of interest (612). Pointer information is then stored to link the new record to a located record within the closest rightward partition. If no such record(s) were encountered before the pointer information at the other (rightward) edge of the database is located, the pointer information is set to "null" (614). In one embodiment, the pointer information is limited to pointing to a record within the rightward adjacent partition. In another embodiment, the pointer may "leapfrog" to a more rightward, non-adjacent partition.

It may be noted that in one embodiment, links are only maintained in one direction. That is, the newly-inserted record may be linked to either a leftward or a rightward record, but not to both. In this scenario, one of these leftward or rightward records will be updated to point to the newly-inserted record, but not vice versa.

If the partitions are doubly-linked such that pointers are maintained in both directions, both the closest leftward and rightward records having the desired index values (if such records exist) are updated to store pointer information directed to the newly-created record (616). Similarly, pointer information is also stored within any linked rightward record to point to the newly-created record.

In one embodiment, not only is a new record created within the secondary index B-tree, but another record is also created within a primary key B-tree (618). This additional record stores a primary key that uniquely identifies the newly-received data. Data may be stored within this record, or within some other location. Processing is then considered complete.

Figures 7, 7C:
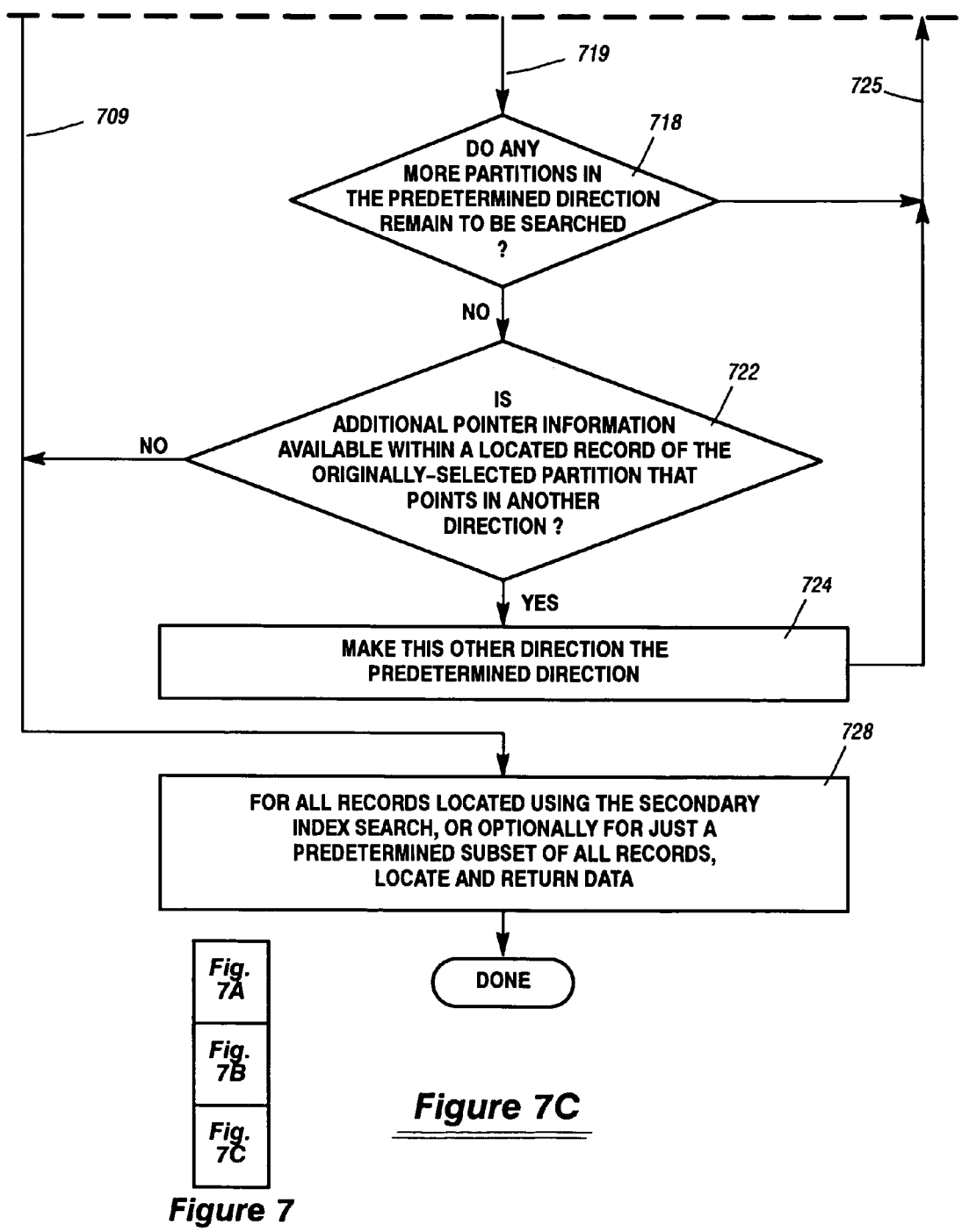
FIGS. 7A, 7B and 7C, when arranged as shown in FIG. 7, describe a method of searching linked partitions according to one embodiment of the current invention.
Figure 7A:
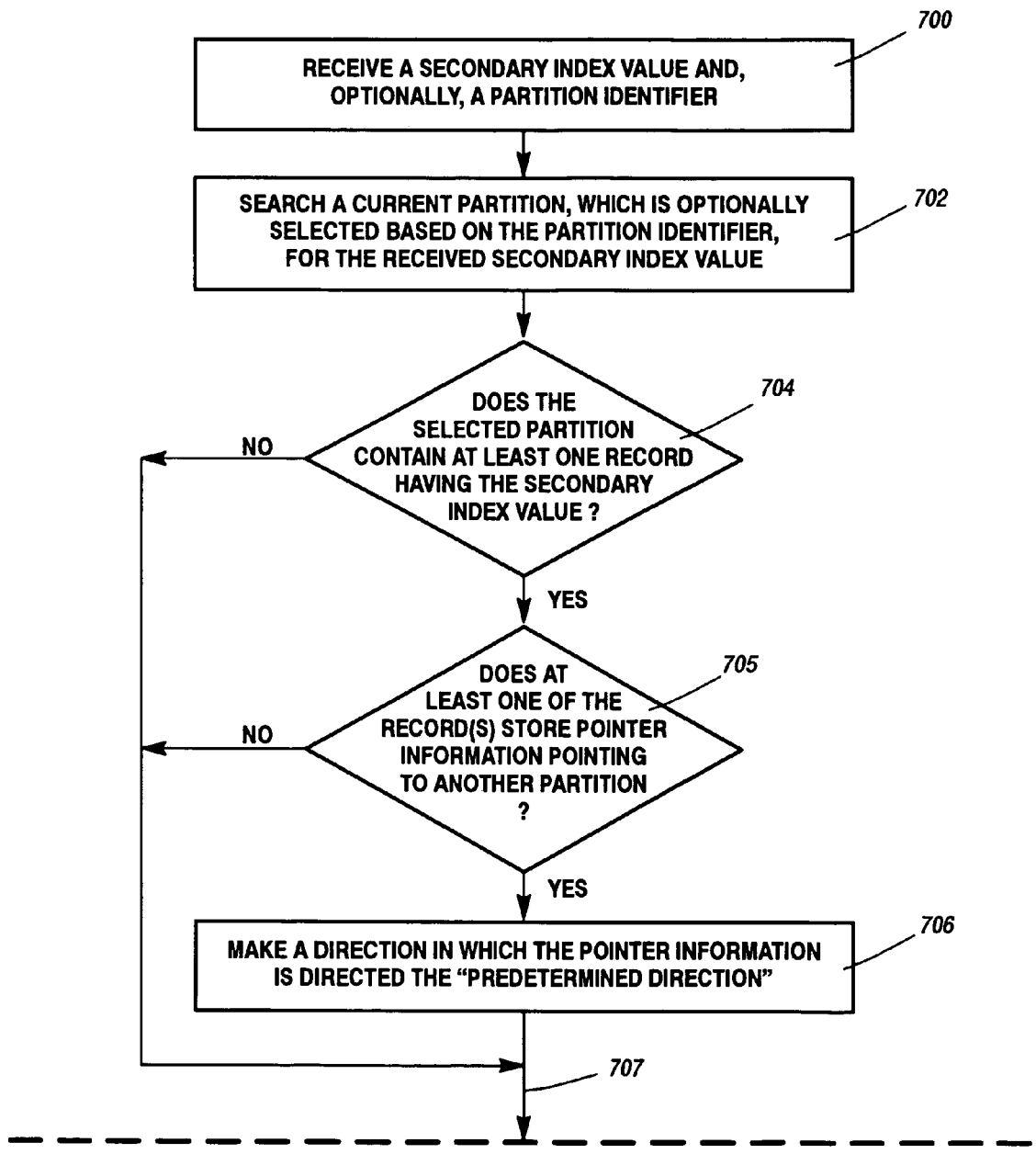
Figure 7B:
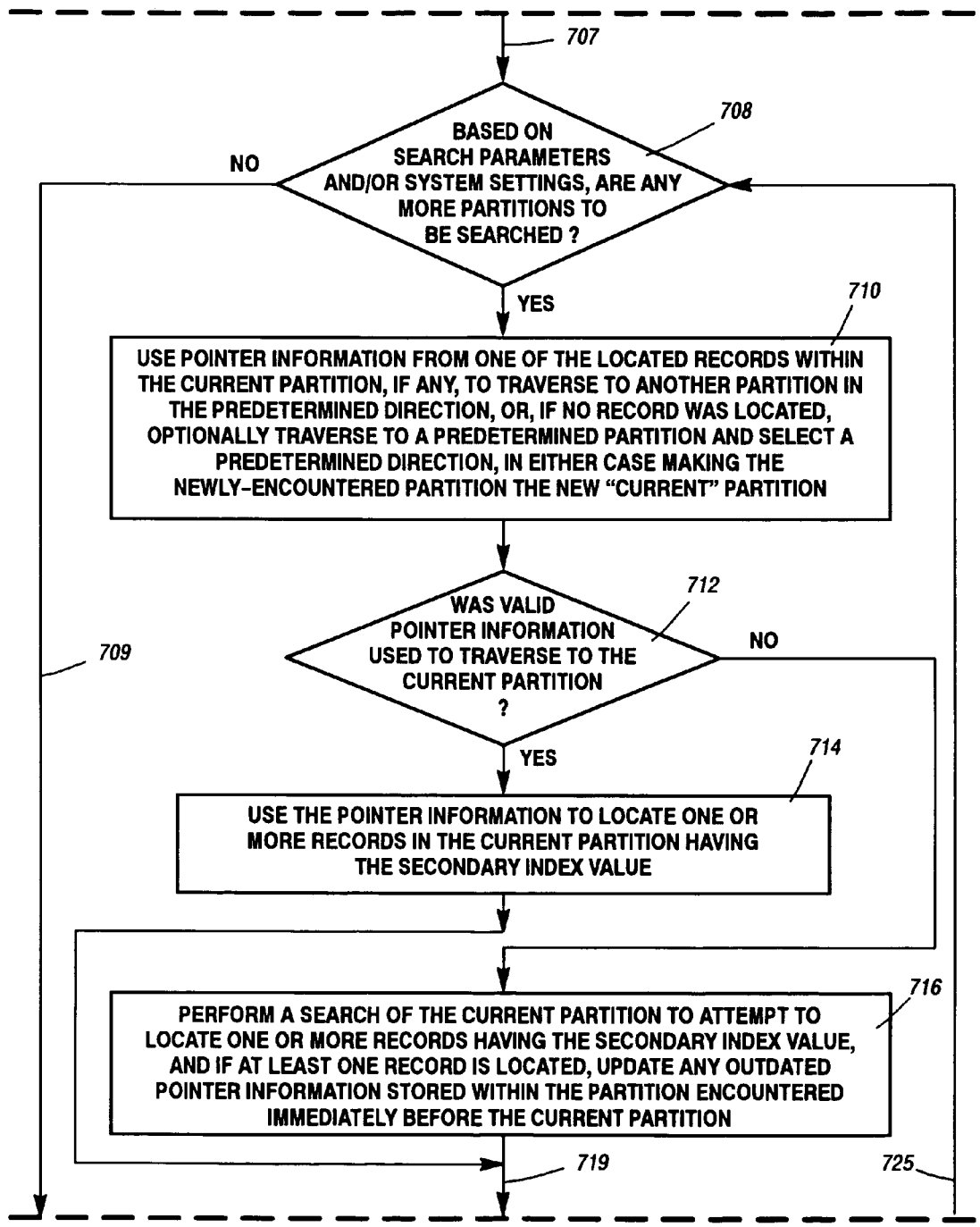

FIGS. 7A, 7B and 7C, when arranged as shown in FIG. 7, describe a method of searching linked partitions according to one embodiment of the current invention. A secondary index value, and optionally, a partition identifier, are first received (700). These values may be provided by a user who is initiating the search. A current partition is searched for the secondary index value (702). The current partition may be selected using the partition identifier. For instance, in the example described in reference to FIG. 3, the user may identify a city as a search parameter. This parameter is then used to select the first partition to be searched. Alternatively, the partition may be selected as that being at one edge of the database, or using some other criteria.

Next, it is determined whether the selected partition contains at least one record having the secondary index value (704). If no such record is located, processing continues to step 708 of FIG. 7B, as indicated by arrow 707. This scenario will be discussed further below.

Returning to step 702 of FIG. 7A, if the secondary index value is located within at least one record of the initially-selected partition, processing continues from decision step 704 to step 705, where it is determined whether at least one of the initially-located record(s) stores pointer information pointing to another partition (706). Assuming this pointer information is not stored within any of the located records, execution continues to step 708 of FIG. 7B, as indicated by arrow 707. This scenario will be discussed further below.

Returning to step 705, if at least one record is located containing pointer information to another partition, processing continues to step 706. The stored pointer information may represent one or more pointers, each of which points in a respective direction. Therefore, in step 706, one of these directions is made the "predetermined direction", and processing continues with step 708 of FIG. 7B, as indicated by arrow 707. As discussed above, in one embodiment, the predetermined direction may be a leftward or rightward direction. In a database that is N dimensional, the predetermined direction may be selected from more than just two possible directions.

In step 708, it is determined whether additional partitions are to be searched for the secondary index value. This determination may be made based on search options provided by the user when the search is initiated. For example, returning to the illustration described in reference to FIG. 3, a search option may allow a user to indicate that the search will "check for business "ACME1" in a City A and the surrounding area". In another embodiment, system parameters set by an administrator may determine whether additional partitions are to be searched, as well as which, and how many, partitions are to be searched, if the initially-selected partition does not contain the index value.

Assuming additional partitions are to be searched, pointer information from one of the located records that is directed in the predetermined direction is used to traverse to another partition (710). This newly-encountered partition is made the new "current" partition. The pointer information will point to a record within this new current partition. Based on data contained within this record, it may be determined whether the pointer information has become obsolete (712). The pointer information is considered valid if the encountered record does contain the desired secondary index value. In this case, the encountered record, and any other records within the partition having the desired secondary index value, may be readily located (714). It may be noted that locating additional records in a series of records may be accomplished using pointers at the leaf node level, if such pointers are available. Processing then continues with step 718 of FIG. 7C, as indicated by arrow 719.

In step 718, it is determined whether additional partitions remain to be searched if the search is continued in the predetermined direction. For instance, if the current partition is located at the left edge of the database, and the search had been occurring in the leftward direction, the search must proceed in a different direction, if possible. If, however, additional partitions do remain to be searched in the predetermined direction, processing returns to step 708 of FIG. 7B. There, it is once again determined whether those partitions that remain to be searched actually are to be searched. This determination is made based on search and/or system parameters, such as determining when a predetermined number of partitions in a certain direction have been searched, determining whether a predetermined partition has been encountered, and so on, as discussed above.

Returning to step 718, if additional partitions do not remain to be searched in the predetermined direction because an edge of a database has been encountered, processing continues to step 722. There, it is determined whether any pointer information pointing in a different "unsearched" direction is stored within one of the records, if any, which was located within the initially-selected partition. If so, this "unsearched" direction is made the new "predetermined" direction (724). Then processing continues with step 708 of FIG. 7B, as indicated by arrow 725 where it is again determined if the search is to continue in this other direction based on system configuration parameters and any search options provided by the user.

Eventually, the user-provided search options or system parameters may dictate in step 708 that no more partitions are to be searched. For instance, the search may be terminated after a predetermined number of partitions are encountered in each direction, or after a predetermined partition is located. The search may alternatively be terminated when a predetermined number of records have been located. In still another embodiment, in step 722 it may be determined that no "unsearched" directions remain within the database, and that edges of the database have been encountered or all existing links have been traversed. In any of these cases, processing continues to step 728 of FIG. 7C, as indicated by arrow 709. In that step, data for all located records may be returned to the user. Optionally, only a limited subset of the data may be returned. For example, it may be desirable to return only data associated with one or more of the located records that stores one or more specified values included within one or more columns of the database, as indicated by original search criteria. For example, a particular primary key value may be used to select the record to be returned to the user. Any type of identifying data located in any of these records may be used to select a subset of the data.

Recall that the step of obtaining the data may involve using a pointer value that is stored within the secondary index record and which points to another storage location within the database. Alternatively, this step may involve retrieving a primary key from the secondary index record, then using this index to search a respective primary key B-tree.

Several other scenarios are possible during execution of the method of FIG. 7. For example, returning to step 712 of FIG. 7B, it is possible that invalid pointer information has been used to traverse to the new "current" partition. This will be determined because the record to which the pointer is directed does not store the desired secondary index value, as may occur if a record or node has been deleted or modified without updating the inter-partition pointer information. In this case, processing continues from step 712 to step 716 where a search is performed of the encountered partition to attempt to locate the one or more records having the secondary index value (716). If one or more such records are located, the outdated pointer information is updated to point to a predetermined one of the located records. In general, if multiple such records were located, the pointer information is directed to a first record in the record series, allowing the other records in the series to be easily located using any leaf-node-level pointers, assuming an embodiment wherein such pointers are available.

Regardless of whether one or more records are located, it is then determined whether any partitions remain to be searched in the predetermined direction (718). From there, processing continues in the manner discussed above.

Returning to step 704 of FIG. 7A, it is possible that, within the initially-selected partition, no record is located having the desired index value. In this case, processing continues to step 708 of FIG. 7B, as indicated by arrow 707 where it is determined whether any additional partitions are to be searched for the secondary index value. As previously discussed, this determination may be made based on search options provided by the user when the search is initiated.

Assuming additional partitions are to be searched, processing continues with step 710 wherein a predetermined partition must be selected as the "current partition" so that the additional search may be initiated. Assuming this partition will not be selected using pointer information because the target index value was not located, this partition may be instead selected based on system parameters or user-specified search options. Also in step 710, some search direction must be selected for traversing the various partitions of the database. This selected direction, which may be selected using any of the mechanisms discussed above, is made the "predetermined direction". Then processing may proceed with step 712. In the current scenario, no valid pointer information was used to traverse to the current partition.

Therefore processing continues to step 716, where an attempt will be made to locate one or more records having the desired index values. Because no obsolete pointer information was used to traverse to the current partition, no pointer information is updated in this step. Processing then continues in the manner discussed above.

The above paragraph describes the situation wherein an index value is not located within an initially-selected partition. In this type of situation, when a next partition is selected to be searched, the search is generally initiated starting at the root node. In an alternative embodiment, when a target index value is not located within a current partition, a record that stores pointer information and that precedes the insertion point for this target index value may be used to traverse to another partition. The search may then continue within this other partition for the target index value without having to initiate the search at the root node. This method may be particularly adapted for use in an embodiment wherein pointer information always points to an adjacent partition, rather than potentially skipping partitions.

In still another scenario, it may be possible that in step 705 of FIG. 7A, no record is located within the initially-selected partition that stores inter-partition pointer information. Instead, all located records store "null" pointer information. This may occur, for instance, in an embodiment wherein pointers are directed solely to adjacent partitions, and both adjacent partitions do not store records having the target secondary index value. This may also occur if no other record in the database stores the desired secondary index value. In this case, processing again continues to step 708 of FIG. 7B. There execution occurs in a manner similar to that described above in the case wherein no record having the secondary index value was located at all.

The foregoing paragraphs assume that when a desired index value is not located within an initially-selected partition, or when pointer information is set to null, processing will continue by searching a different partition. This need not be the case. For instance, user-provided search options or system parameters may dictate that if either of these situations arise in step 710 of FIG. 7B, the search will be terminated.

Figures 8, 8A:
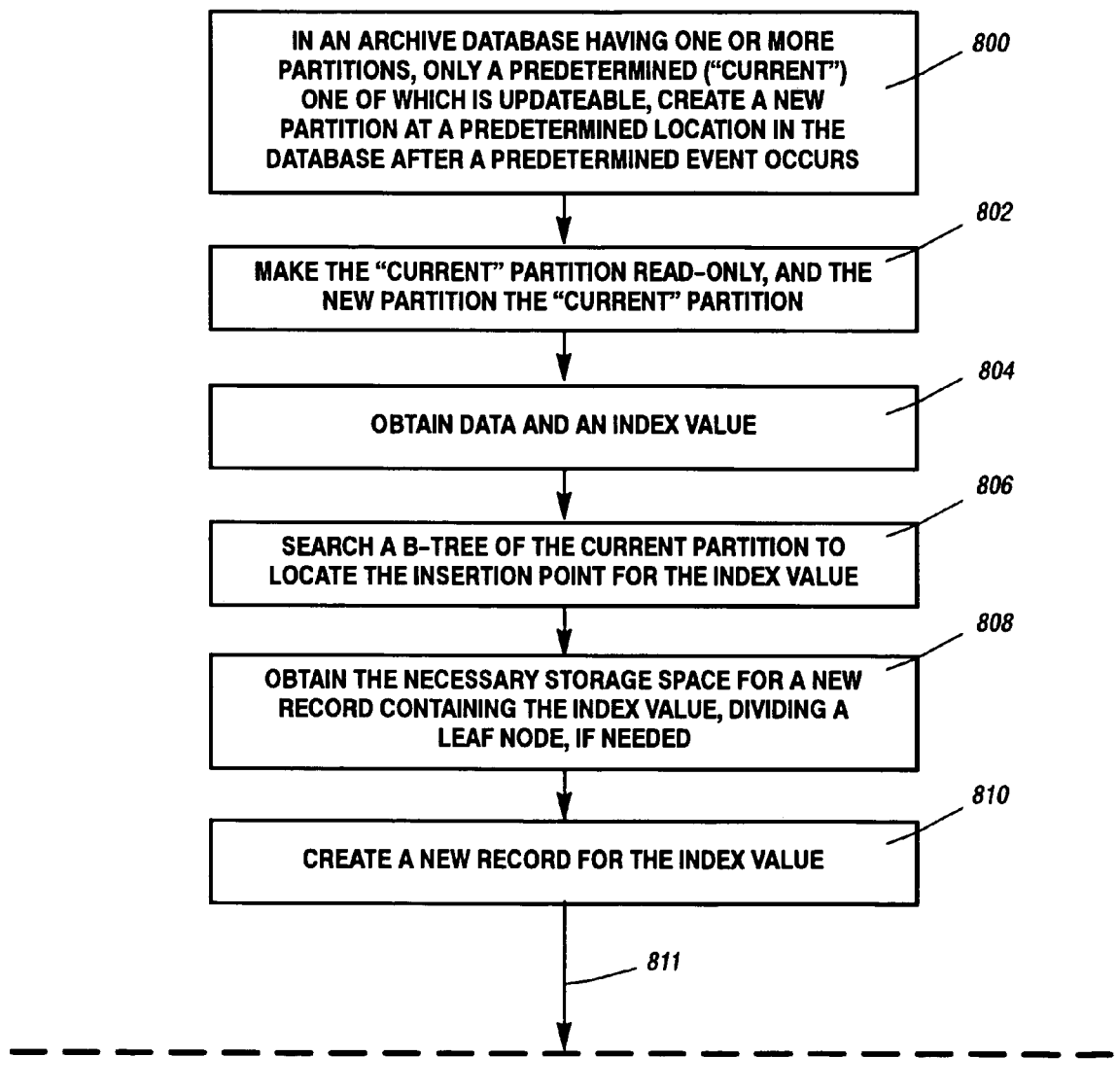
FIGS. 8A and 8B, when arranged as shown in FIG. 8, are a flow diagram illustrating one embodiment of adding data to an archive database according to the current invention.
Figure 8B:
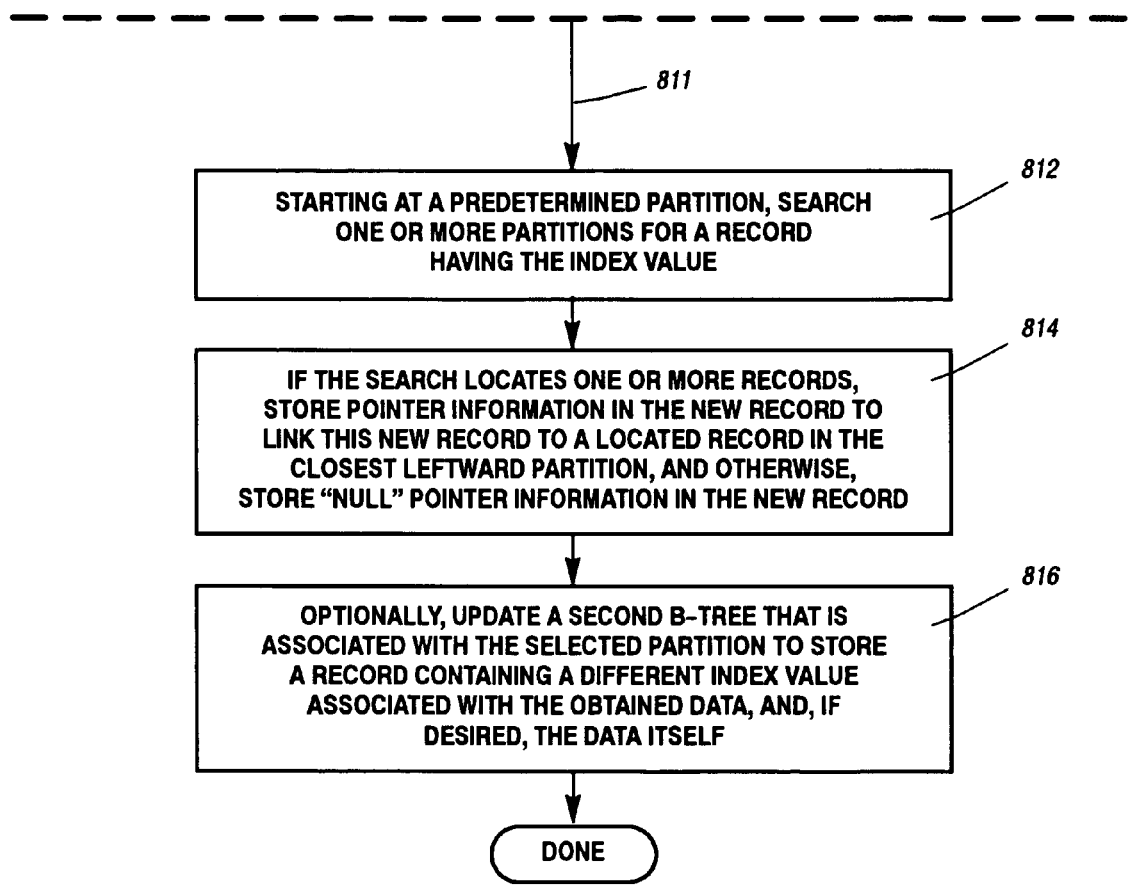

FIGS. 8A and 8B, when arranged as shown in FIG. 8, are a block diagram that illustrate one embodiment of adding data to an archive database according to the current invention. In this archive database, one or more partitions exist. Only a predetermined "current" one of the partitions is updateable, and all others are read-only. In this partition, a new partition is created at a predetermined location within the database after a predetermined event occurs (800). The new partition is generally added to the right edge of the database, but may alternatively be added to a left edge. The event may be the expiration of a time period, the receipt of predetermined data, or any other event. The "current" partition is then made read-only, and the newly-added partition is made the new "current" partition (802).

Sometime in the future, data is obtained. This data is associated with a secondary index value (804). A secondary index B-tree for the current partition is searched to locate the insertion point for this index value (806). The necessary storage space for a new record containing the secondary index value is then obtained at the insertion point (808). In some cases, this may involve splitting a leaf node to secure the necessary storage space for the record. Next, a record containing information pertaining to the data is created (810). This record contains the index value, may optionally contain one or more other index values or a pointer directed to a location at which the data is stored. In some embodiments, the record may store the data itself.

Processing proceeds to FIG. 8B, as indicated by arrow 811, where a search is performed to locate a partition closest to the current partition that stores a record having the same index value (812). In an embodiment wherein the current partition is at a right edge of the database, this search starts with the adjacent leftward partition and proceeds leftward. In another embodiment, the current partition is at the left edge, and the search begins with the adjacent rightward partition and proceeds rightward. In any event, if this search locates one or more records, pointer information is stored within the newly-created record that points to a record located in a partition that is closest to the current partition (814). If multiple records are located within the same closest partition, the pointer information is directed to a predetermined one of these records, such as the record which is the first in a series of records. In the event that the search did not locate any records, the pointer information is instead set to "null". Finally, another B-tree such as a primary key B-tree that is associated with the current partition may be updated to store a record for the data. This record may store additional information such as a pointer to the data, another index value such as a primary key, or, optionally, the data itself (816). Processing is then considered complete.

Figures 9, 9A:
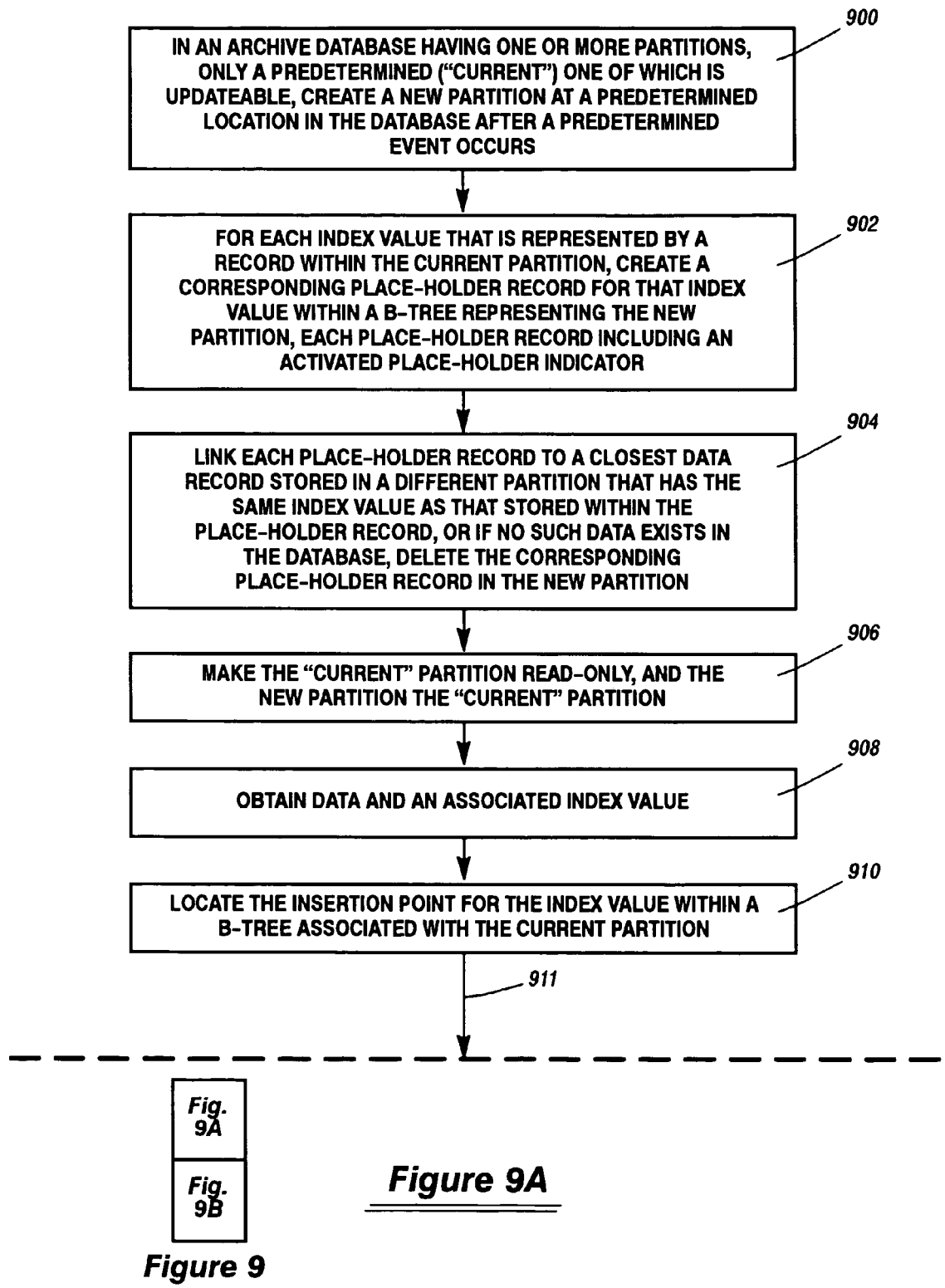
FIGS. 9A and 9B, when arranged as shown in FIG. 9, are a flow diagram of another method of storing data to an archive database according to the current invention.
Figure 9B:
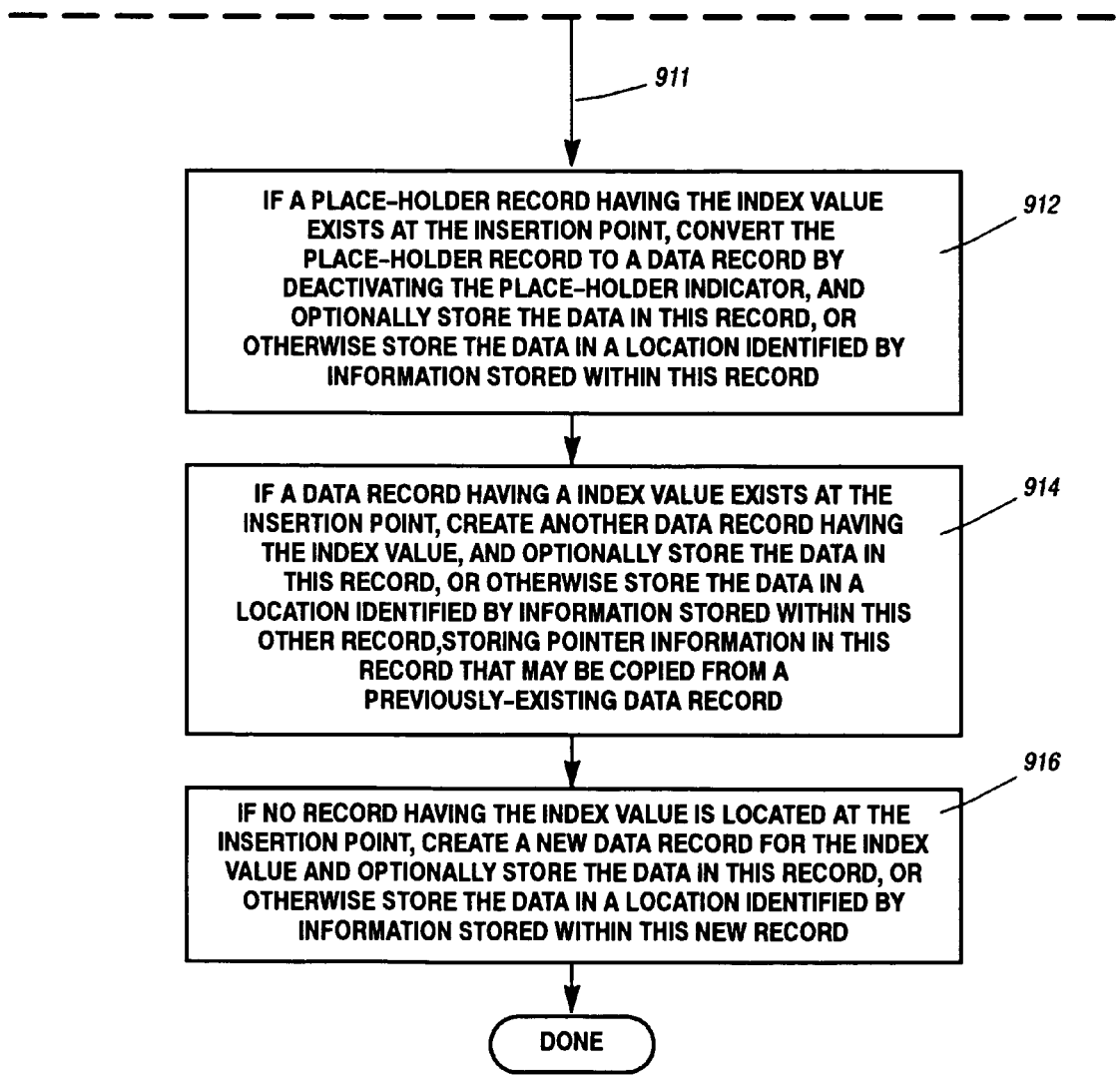

FIGS. 9A and 9B, when arranged as shown in FIG. 9, are a flow diagram of another method of storing data to an archive database according to the current invention. This alternative embodiment is similar to the method described above, except that it populates newly-created partitions with place-holder records before any data is stored to the newly-created partition. According to this method, the archive database includes one or more partitions. Only a predetermined "current" one of the partitions is updateable, and all others are read-only. Upon the occurrence of some predetermined event, a new partition is created at a predetermined location within the database (900). The new partition is generally added to the right edge of the database, but may alternatively be added to a left edge. Next, for each index value that is represented by a record within the current partition, a corresponding place-holder record is created within the new partition (902). The place-holder record has the same index value as that stored by the corresponding record within the current partition, and has an indicator activated to identify the record as a place-holder, rather than a data, record.

Each place-holder record is linked to a closest data record that stores the index value stored by the place-holder record, and that resides within another partition (904). For example, when considering a first partition that is adjacent to the new partition, and a second partition that is not adjacent to the new partition, wherein each of the first and second partitions stores a data record having the index value of a place-holder record in the new partition, the record within the adjacent partition is considered "closest" to the new record. If no such data record within another partition is located, the place-holder record within the new partition is deleted in the preferred embodiment.

It may be noted that step 904 of linking place-holder records to data records in a new partition may be completed using the place-holder records in a current partition. That is, each place-holder record within the current partition stores a pointer to a data record. This pointer information may be copied, with or without verification, to the corresponding newly-created place-holder record in the new partition. This will eliminate the need to search the partitions to locate any existing data record. It may be further noted, however, that pointer information that is copied in this manner is not necessarily guaranteed to be current. This pointer information may be verified as valid at the time it is copied to the new partition by determining whether it points to a data record having the desired index value. Alternatively, this verification step may be performed when the pointer information is used during a subsequent search operation, if desired.

Next, the "current" partition is made read-only, and the new partition is designated the new "current" partition (906). This completes the process of creating a new partition according to the current method.

Sometime thereafter, data is obtained that is associated with an index value (908). A B-tree for the current partition is searched to locate the insertion point for the index value (910). Processing continues to FIG. 9B, as indicated by arrow 911. In step 912, if a place-holder record having the index value exists at the insertion point, the place-holder record is converted to a data record by deactivating the place-holder indicator that is stored within this record. The data may be stored within this record, or the record may store other information that identifies the storage location of the data. This other information may include a pointer to the data, or a different index value identifying a record within a different B-tree, such as a primary key B-tree.

In another scenario, a data record having the index value already exists at the insertion point. In this case, another data record is created having the index value (914). This record may store the data itself, and/or other information that describes the data, such as information pointing to the storage location of the data, or another index value such as that described above. The pointer information that is stored by this record may be copied from the other data record having the same index value. In one embodiment, only one of the predetermined records, such as a first or a last record in the series of data records, need store this pointer information. In another embodiment, each of the data records in the series stores pointer information.

In still another scenario, neither a place-holder nor a data record is located at the insertion point. This indicates the index value is being stored within the database for the first time. Therefore, a new data record is created to store the index value having pointer information set to "null" (916). This new data record may store the data itself, or may store information describing the data in a manner similar to that described above. It may be noted that in either steps 914 or 916 above, it may be necessary to split a leaf node to create the room needed to store the new data record. Execution is then considered complete.

Figures 10, 10A:
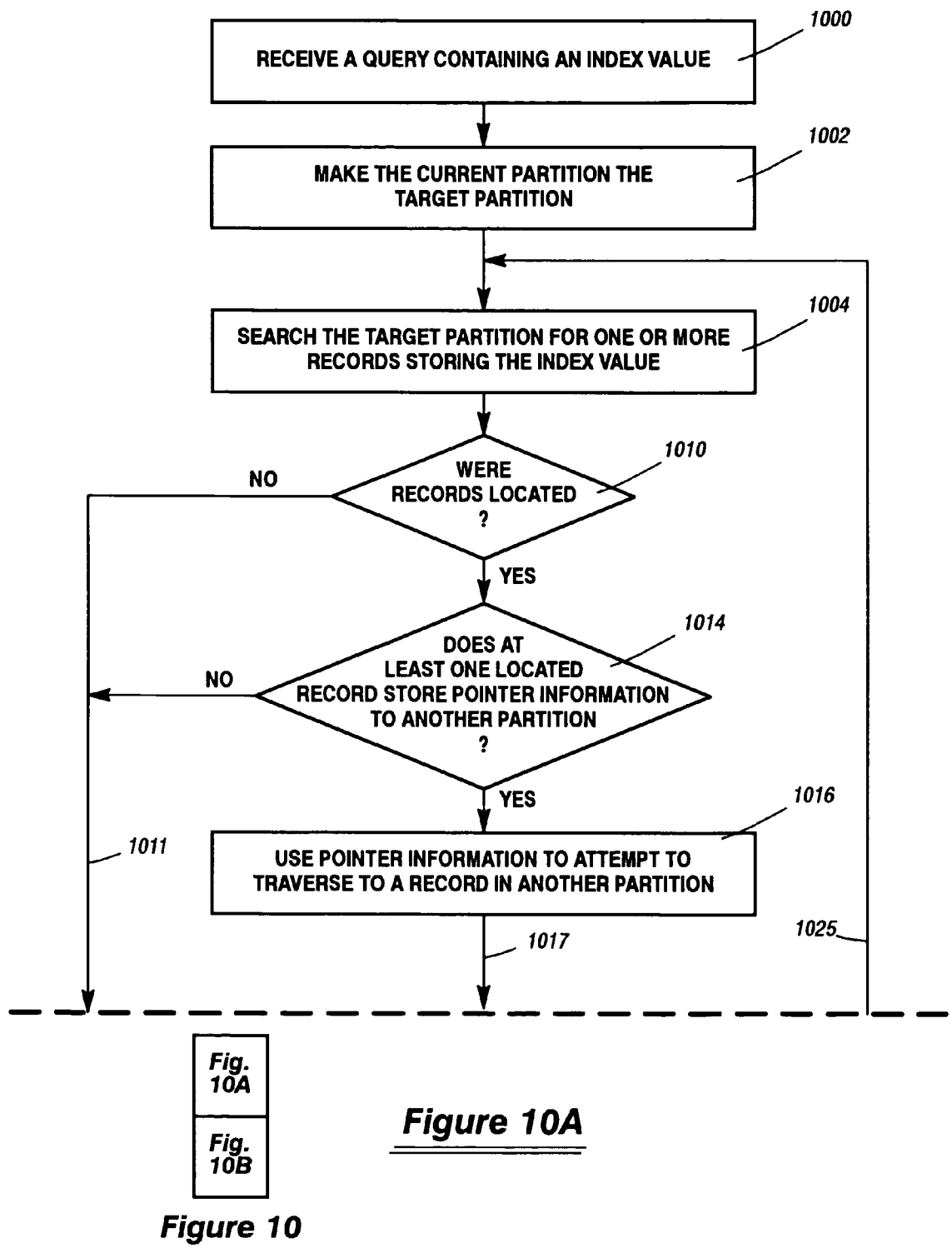
FIGS. 10A and 10B, when arranged as shown in FIG. 10, are a flow diagram illustrating one embodiment of searching an archive database such as that described in FIG. 9 that utilizes place-holder records.
Figure 10B:
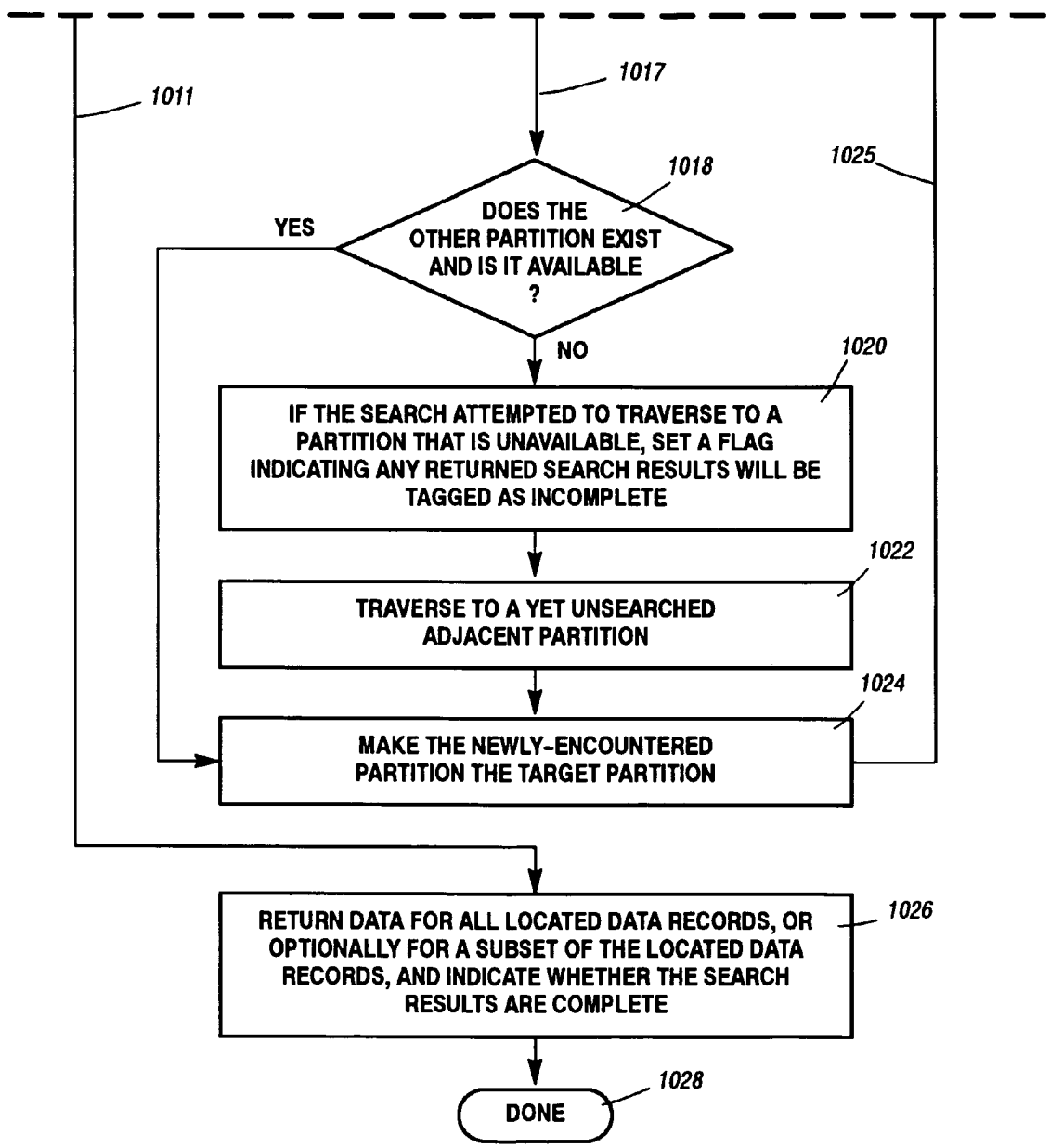

FIGS. 10A and 10B, when arranged as shown in FIG. 10, are a flow diagram illustrating one embodiment of searching an archive database such as that described in FIG. 9 that utilizes place-holder records. According to this method, a query is received that identifies an index value (1000). The search for this index value begins at the "current" partition, which is the only updateable partition in the database. This partition is made the target partition (1002). This target partition is searched for one or more records storing the index value (1004). If no records are located with the target index value in the current partition, than no other partitions within the database store the index value either. Recall that this is so because of the way placeholder records are used to record the index values present in the database. If no records are present, processing may continue with step 1026 of FIG. 10B, as indicated by arrow 1011.

In step 1026 of FIG. 10B, data for all located data records may be retrieved and returned to the user, or alternatively, only the data associated with a subset of the located data records may be returned. The data that is to be returned may be determined based on search options specified by the user, or parameters set by an administrator. Search results will also indicate whether the results are complete, or are instead incomplete because one or more partitions were unavailable during the search, as will be discussed further below.

It may be noted that in some instances, it is possible that no data records are located, and this step will therefore not return any data, as is the case in the currently-discussed scenario. In the current scenario, execution is therefore considered complete without returning any data (1028).

Returning to step 1010, if records were located during the search of the target partition, processing continues to step 1014, as indicated by arrow 1013. There, it is determined whether at least one of the located records stores pointer information directed to another partition. If all of the pointer information is "null" for the located records, processing continues to step 1026, as indicated by arrow 1011, wherein all, or just a subset, of the data associated with any previously located data records is returned to the user along with an indication as to whether these results are complete, or are instead incomplete because some partitions were unavailable in a manner to be discussed below. Then execution is considered complete (1028).

If, in step 1014, at least one record was located storing pointer information to another partition, this pointer information is used in attempt to traverse to a record in another partition (1016). If this other partition exists and is available (1018), this other partition may be made the new target partition (1024), and processing continues with step 1004 of FIG. 10A, as indicated by arrow 1025. There, the search of the (new) target partition is initiated (1004).

In another scenario, it may be determined in step 1018 that the other partition either does not exist, or is not available. In this case, processing continues to step 1020. If, in step 1020 the search attempts to traverse to a partition that is unavailable, as may occur because the other partition is locked by another query, a flag is set to indicate that any returned search results are incomplete because the search could not access a required partition. Otherwise, if the partition is not unavailable but has instead been deleted such that it does not exist, step 1020 is skipped. In either case, execution continues with step 1022, where the search traverses to a yet unsearched adjacent partition. This adjacent partition is made the new target partition, and processing returns to step 1004 of FIG. 10A as indicated by arrow 1025, where the partition will be searched. If this adjacent partition, which has become the new target partition, does not contain the index value in either a data or a place-holder record, then the search may be concluded, regardless of whether the previous target partition was merely unavailable, or had been deleted. If, however, this new target partition does contain either a place-holder or a data record, the search may continue as previously described.

In one instance, the search may proceed all the way to the edge of the database. In this case, any located records will only store "null" pointer information in decision step 1014, and the search will proceed to step 1026, where data for any located data records will be returned to the user. An indication may also be provided as to whether the returned search results are complete. This indication is based on whether a flag was set in step 1020 following the traversal to an unavailable partition. The search may then be considered complete (1028).

It may be noted that many alternative embodiments of the foregoing system and method are possible within the scope of the current invention. For instance, many of the method steps of FIGS. 6-10 may be re-ordered, and in some cases, entirely deleted, based on implementation choices. Other variations are possible. Thus, the breadth and scope of the present invention should not be limited by any of the above-described exemplary embodiments, but should be defined only in accordance with the following Claims and their equivalents.

What is claimed is:

1. A method of managing a database that includes multiple partitions, each storing records containing data, the method comprising:

creating a first record that stores an index value and that is inserted within a selected one of the partitions;

attempting to locate at least one record that stores the index value and that is included within a different one of the partitions; and if one or more records are located, storing within the first record information indicating the location of at least one of the located records.

2. The method of claim 1, and further including storing within at least one of the located records the location of the first record.

3. The method of claim 1, and further including:
receiving a query for data associated with the index value;
searching the first partition to locate the first record; and
using the information within the first record to locate the at least one record.

4. The method of claim 1, wherein the database stores multiple index values, and further including:

deleting a record within a selected one of the partitions that stores a selected one of the index values; and modifying any other partitions, if necessary, so that no records within these other partitions store information indicating the location of the deleted record.

5. The method of claim 1, wherein the database stores multiple index values, wherein the records are selected from a group that includes place-holder records not associated with data, and data records associated with data, and further including:

a) creating the first partition to be adjacent to a second of the partitions;

b) for each index value within the second partition, creating a respective one of the place-holder records within the first partition;

c) for each place-holder record, attempting to locate a closest one of the data records that resides in other than the first partition and that stores the same index value as is stored within the place-holder record; and d) storing information within the place-holder record to indicate the location of any data record located in step c), or if no data record was located, storing null information within the place-holder record.

6. The method of claim 1, wherein the database is an archive database, and wherein ones of the partitions are each respectively associated with an earlier-created adjacent partition, wherein for each index value stored within the earlier-created adjacent partition, at least one record exists in the respectively-associated partition storing the index value, and further including:

receiving a query associated with a target index value; and
searching a predetermined one of the multiple partitions for a record storing the target index value, and if no such record is located, providing query results indicating no data is stored within the database that is associated with the target index value.

7. The method of claim 1, wherein the database is an archive database, and wherein ones of the partitions are respectively associated with an earlier-created adjacent partition, wherein for each index value stored within an earlier-created adjacent partition, at least one record exists in the respectively-associated partition storing the index value, and further including:

a) receiving a query associated with a target index value;
b) making a predetermined one of the multiple partitions the current partition;
c) searching the current partition for a record storing the target index value;
d) using any valid pointer information stored within any located record of the current partition to traverse to another partition, and make this other partition the current partition;
e) locating all records within the current partition that store the target index value; and
repeating the steps d) and e) of claim 7 until no more records having valid pointer information are located.

8. The method of claim 7, wherein the records are selected from a group that includes place-holder records not associated with data, and data records associated with data, and further including:

using all of the data records that were located during the steps of claim 7 to further locate data; and
returning all located data in response to the query.

9. The method of claim 1, wherein the partitions each include leaf and non-leaf nodes, and wherein storing of the information includes storing information identifying one of the non-leaf nodes within the at least one of the located records.

10. A method of managing records that store data of a database, comprising:

creating multiple partitions, each storing associated ones of the records; and associating a first record stored within a selected one of the partitions with one or more other records included within one or more different ones of the partitions based on index values stored within the first record and the one or more other records.

11. The method of claim 10, and further including:
a) receiving a query that contains a target index value;
b) searching a selected one of the partitions for one or more records containing the target index value;
c) using information, if any, that is stored within a record located during the search to further locate one or more associated records that are included in a different partition; and
repeating steps b) and c) until the sooner of no records being located in step b) or no information being stored in step c).

12. The method of claim 10, wherein the associating step includes at least one of:

storing identification information within the first record to identify at least one of the other records; and storing identification information within at least one of the other records to identify the first record.

13. The method of claim 10, and further including:
a) creating a current partition that is updateable;
b) until a predetermined event occurs, making all modifications to the database within the current partition;
c) upon the occurrence of the event, making the current partition read-only and creating a new updateable partition that is made the current partition; and
d) repeating steps b) through c) one or more times.

14. The method of claim 13, wherein creating a new updateable partition includes, for each index value stored within the current partition, creating a record storing the index value within the new updateable partition and linking the created record to a closest record within a different partition that is associated with data stored within the database, if any such record exists.

15. A database management system for managing a database, including:
- partition creation means for creating multiple partitions, each including respectively associated records that store data, wherein ones of the records store information for locating one or more associated records included within one or more other partitions; and
- partition searching means for searching one of the partitions in attempt to locate one or more records identified by a query, and for using information stored within a located record to locate all associated records stored within any partitions of the database.

16. The system of claim 15, wherein the partition creation means includes means for managing at least one B-tree for each of the multiple partitions.

17. The system of claim 15, wherein the partition creation means includes means for managing one or more primary key B-trees and one or more secondary index B-trees.

18. The system of claim 15, wherein each of the records stores at least one index value, and the partition creation means includes means for creating each partition to include records storing index values that are selected based on the index values contained in a different associated partition.

19. The system of claim 15, wherein each of the records stores at least one index value, and wherein the partition searching means includes means for determining, upon encountering a partition that does not store a target index value, that the target index value does not exist within any of the partitions.

20. A data processing system, comprising:
- a database to store records that each includes an index value; and
- a database management system coupled to the database to create multiple partitions that each includes a subset of the records that store data, and to link one or more records from one partition each to one or more other records in one or more other partitions that store associated data.

21. The system of claim 20, wherein the database management system includes means for maintaining, for each of the partitions, a B-tree that stores the records within the partition.

22. The system of claim 20, wherein the B-tree is a secondary index B-tree, and records are linked to predetermined other records in other partitions that store a same secondary index value.

* * * * *